US010945286B2

(12) United States Patent
Ly et al.

(10) Patent No.: US 10,945,286 B2
(45) Date of Patent: Mar. 9, 2021

(54) BEAM-SPECIFIC SYSTEM INFORMATION SCHEDULING WINDOW DESIGN

(71) Applicant: QUALCOMM incorporated, San Diego, CA (US)

(72) Inventors: Hung Dinh Ly, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/529,656

(22) Filed: Aug. 1, 2019

(65) Prior Publication Data

US 2020/0045737 A1 Feb. 6, 2020

Related U.S. Application Data

(60) Provisional application No. 62/714,544, filed on Aug. 3, 2018.

(51) Int. Cl.
*H04W 4/00* (2018.01)
*H04W 74/08* (2009.01)
(Continued)

(52) U.S. Cl.
CPC ........ *H04W 74/0808* (2013.01); *H04L 1/1816* (2013.01); *H04L 1/1832* (2013.01); *H04W 72/1289* (2013.01)

(58) Field of Classification Search
CPC ...... H04W 72/04; H04W 88/08; H04W 76/00
See application file for complete search history.

(56) References Cited

U.S. PATENT DOCUMENTS

2010/0297991 A1* 11/2010 Dahlman ............... H04L 1/08
455/422.1
2016/0366665 A1* 12/2016 Xia ....................... H04W 28/06
(Continued)

FOREIGN PATENT DOCUMENTS

WO WO2018097680 A1 5/2018
WO WO2019098927 A1 5/2019
(Continued)

OTHER PUBLICATIONS

International Search Report and Written Opinion—PCT/US2019/044871—ISA/EPO—Oct. 13, 2020.
(Continued)

*Primary Examiner* — Siren Wei

(57) ABSTRACT

Methods, systems, and devices for wireless communications are described. A user equipment (UE) may observe control channel monitoring occasions (PMOs) corresponding to different beams configured by a base station. The UE may identify a PMO in a system information window to monitor for downlink control information scheduling a shared channel carrying a system information message. The UE may receive an indication of which synchronization signal/physical broadcast channel (SS/PBCH) blocks are actually transmitted by the base station and determine corresponding PMOs within the system information window. The UE may then monitor for the downlink control channel within the system information window during the corresponding PMOs. The base station and the UE may also implement techniques for system information message repetition within a system information window.

56 Claims, 20 Drawing Sheets

(51) Int. Cl.
*H04W 72/12* (2009.01)
*H04L 1/18* (2006.01)

(56) References Cited

U.S. PATENT DOCUMENTS

| | | | | |
|---|---|---|---|---|
| 2017/0230977 | A1* | 8/2017 | Shen | H04W 72/042 |
| 2018/0287761 | A1* | 10/2018 | You | H04L 5/00 |
| 2019/0037509 | A1* | 1/2019 | Li | H04L 5/001 |
| 2019/0045525 | A1* | 2/2019 | Shi | H04L 5/0044 |
| 2019/0098590 | A1* | 3/2019 | Nam | H04W 24/08 |
| 2019/0159203 | A1 | 5/2019 | Kim et al. | |
| 2019/0306832 | A1* | 10/2019 | Si | H04L 27/2666 |
| 2020/0244530 | A1* | 7/2020 | Lin | H04W 72/1289 |

FOREIGN PATENT DOCUMENTS

| | | |
|---|---|---|
| WO | WO2019099443 A1 | 5/2019 |
| WO | WO2019099661 A1 | 5/2019 |

OTHER PUBLICATIONS

Qualcomm Incorporated: "NR SI Scheduling", 3GPP Draft, 3GPP TSG-RAN WG2 Meeting #Ah-1807,R2-1810512,NR SI Scheduling 3RD Generation Partnership Project (3GPP), MobileCompetence Centre, 650, Route Des Lucioles, F-06921, Sophia-Antipolis Cedex; France, vol. Ran WG2, no. Montreal, Canada, Jul. 2, 2018-Jul. 6, 2018, Jul. 1, 2018, XP051467670, 4 Pages, Retrieved from the Internet: URL: http://www.3gpp.org/ftp/Meetings°5F3GPP°5FSYNC/RAN2/Docs [retrieved on Jul. 1, 2018] The Whole Document.
Vivo: "Remaining Details on Other System Information Delivery", 3GPP Draft, 3GPP TSG RAN WG1 Meeting #92, R1-1801509 Remaining Details on Other System Information Delivery, 3RD Generation Partnership Project (3GPP), Mobile Competence Centre, 650, Route Des Lucioles, F-06921, Sophia-Antipolis, vol. Ran WG1. no. Greece, Athens, Feb. 26, 2018- Mar. 2, 2018, Feb. 15, 2018 (Feb. 15, 2018), XP051396761, 3 Pgs, Retrieved from the Internet: URL: http://www.3gpp.org/ftp/tsg%5Fran/WG1%5FRL1/TSGR1%5F92/Docs/ [retrieved on Feb. 15, 2018] p. 1 - p. 2.

* cited by examiner

BEAM-SPECIFIC SYSTEM INFORMATION SCHEDULING WINDOW DESIGN

CROSS REFERENCE

The present Application for Patent claims the benefit of U.S. Provisional Patent Application No. 62/714,544 by L Y, et al., entitled "BEAM-SPECIFIC SYSTEM INFORMATION SCHEDULING WINDOW DESIGN," filed Aug. 3, 2018, assigned to the assignee hereof, and expressly incorporated by reference herein.

BACKGROUND

The following relates generally to wireless communications, and more specifically to beam-specific system information scheduling window design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE may search for system information from a base station. To receive the system information, the UE may monitor for downlink control information carrying scheduling information for the system information. Conventional techniques for monitoring for the downlink control information may be improved.

SUMMARY

A method of wireless communication is described. The method may include receiving, from a base station that transmits SS/PBCH blocks, an indication of which SS/PBCH blocks are actually transmitted by the base station, determining, based on the indication, corresponding physical downlink control channel monitoring occasions within a system information window, and monitoring a physical downlink control channel within the system information window during the corresponding physical downlink control channel monitoring occasions.

An apparatus for wireless communication is described. The apparatus may include a processor, memory in electronic communication with the processor, and instructions stored in the memory. The instructions may be executable by the processor to cause the apparatus to receive, from a base station that transmits SS/PBCH blocks, an indication of which SS/PBCH blocks are actually transmitted by the base station, determine, based on the indication, corresponding physical downlink control channel monitoring occasions within a system information window, and monitor a physical downlink control channel within the system information window during the corresponding physical downlink control channel monitoring occasions.

Another apparatus for wireless communication is described. The apparatus may include means for receiving, from a base station that transmits SS/PBCH blocks, an indication of which SS/PBCH blocks are actually transmitted by the base station, determining, based on the indication, corresponding physical downlink control channel monitoring occasions within a system information window, and monitoring a physical downlink control channel within the system information window during the corresponding physical downlink control channel monitoring occasions.

A non-transitory computer-readable medium storing code for wireless communication is described. The code may include instructions executable by a processor to receive, from a base station that transmits SS/PBCH blocks, an indication of which SS/PBCH blocks are actually transmitted by the base station, determine, based on the indication, corresponding physical downlink control channel monitoring occasions within a system information window, and monitor a physical downlink control channel within the system information window during the corresponding physical downlink control channel monitoring occasions.

In some examples of the method, apparatuses, and non-transitory computer-readable medium described herein, receiving the indication of which SS/PBCH blocks may be actually transmitted by the base station may include operations, features, means, or instructions for receiving an index of each actually transmitted SS/PBCH block, a duration for the physical downlink control channel monitoring occasions, a duration of the system information window, a number of actually transmitted SS/PBCH blocks, or any combination thereof, via a SIB1.

Some examples of the method, apparatuses, and non-transitory computer-readable medium described herein may further include operations, features, means, or instructions for determining a starting time within the system information window for each of the corresponding physical downlink control channel monitoring occasions.

Some examples of the method, apparatuses, and non-transitory computer-readable medium described herein may further include operations, features, means, or instructions for determining the starting time for each of the corresponding physical downlink control channel monitoring occasions may be based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof.

In some examples of the method, apparatuses, and non-transitory computer-readable medium described herein, the starting time for each of the corresponding physical downlink control channel monitoring occasions may be the same in different system information windows.

In some examples of the method, apparatuses, and non-transitory computer-readable medium described herein, the starting time for each of the corresponding physical downlink control channel monitoring occasions may be different in different system information windows.

Some examples of the method, apparatuses, and non-transitory computer-readable medium described herein may further include operations, features, means, or instructions for monitoring retransmissions of the physical downlink control channel and system information messages based on a multiplexing of the physical downlink control channel monitoring occasions into a transmission, wherein the transmission is repeated within the system information window.

Some examples of the method, apparatuses, and non-transitory computer-readable medium described herein may further include operations, features, means, or instructions for monitoring retransmissions of the physical downlink control channel within the system information window.

In some examples of the method, apparatuses, and non-transitory computer-readable medium described herein, monitoring retransmissions of the physical downlink control channel may include operations, features, means, or instructions for monitoring retransmissions of the physical downlink control channel that may be continuous in time with an initial transmission of the physical downlink control channel.

In some examples of the method, apparatuses, and non-transitory computer-readable medium described herein, monitoring retransmissions of the physical downlink control channel messages may include operations, features, means, or instructions for monitoring retransmissions of the physical downlink control channel that may be non-continuous in time with an initial transmission of the physical downlink control channel.

Some examples of the method, apparatuses, and non-transitory computer-readable medium described herein may further include operations, features, means, or instructions for identifying, via the monitored physical downlink control channel, one or more physical downlink shared channel resource allocations for receipt of other system information.

In some examples of the method, apparatuses, and non-transitory computer-readable medium described herein, the one or more physical downlink shared channel resource allocations may be the same as corresponding resource allocations for physical downlink shared channel messages carrying remaining minimum system information associated with the SS/PBCH blocks which may be actually transmitted by the base station having a control resource set multiplexing pattern 1.

In some examples of the method, apparatuses, and non-transitory computer-readable medium described herein, the one or more physical downlink shared channel resource allocations may be the same as corresponding resource allocations for physical downlink shared channel messages carrying remaining minimum system information associated with the SS/PBCH blocks which may be actually transmitted by the base station based on a multiplexing pattern.

A method of wireless communications is described. The method may include determining, based on SS/PBCH blocks which are actually transmitted, corresponding physical downlink control channel monitoring occasions within a system information window, transmitting, to a UE, an indication of which SS/PBCH blocks are actually transmitted, and transmitting a physical downlink control channel within the system information window during the corresponding physical downlink control channel monitoring occasions.

An apparatus for wireless communications is described. The apparatus may include a processor, memory in electronic communication with the processor, and instructions stored in the memory. The instructions may be executable by the processor to cause the apparatus to determine, based on SS/PBCH blocks which are actually transmitted, corresponding physical downlink control channel monitoring occasions within a system information window, transmit, to a UE, an indication of which SS/PBCH blocks are actually transmitted, and transmit a physical downlink control channel within the system information window during the corresponding physical downlink control channel monitoring occasions.

Another apparatus for wireless communications is described. The apparatus may include means for determining, based on SS/PBCH blocks which are actually transmitted, corresponding physical downlink control channel monitoring occasions within a system information window, transmitting, to a UE, an indication of which SS/PBCH blocks are actually transmitted, and transmitting a physical downlink control channel within the system information window during the corresponding physical downlink control channel monitoring occasions.

A non-transitory computer-readable medium storing code for wireless communications is described. The code may include instructions executable by a processor to determine, based on SS/PBCH blocks which are actually transmitted, corresponding physical downlink control channel monitoring occasions within a system information window, transmit, to a UE, an indication of which SS/PBCH blocks are actually transmitted, and transmit a physical downlink control channel within the system information window during the corresponding physical downlink control channel monitoring occasions.

In some examples of the method, apparatuses, and non-transitory computer-readable medium described herein, transmitting the indication of which SS/PBCH blocks may be actually transmitted may include operations, features, means, or instructions for transmitting an index of each actually transmitted SS/PBCH, a duration for the physical downlink control channel monitoring occasions, a duration of the system information window, a number of actually transmitted SS/PBCH blocks, or any combination thereof, block via a SIB1.

Some examples of the method, apparatuses, and non-transitory computer-readable medium described herein may further include operations, features, means, or instructions for determining a starting time within the system information window for each of the corresponding physical downlink control channel monitoring occasions.

Some examples of the method, apparatuses, and non-transitory computer-readable medium described herein may further include operations, features, means, or instructions for determining the starting time for each of the corresponding physical downlink control channel monitoring occasions may be based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof.

Some examples of the method, apparatuses, and non-transitory computer-readable medium described herein may further include operations, features, means, or instructions for transmitting retransmissions of the physical downlink control channel and system information messages based on a multiplexing of the physical downlink control channel monitoring occasions into a transmission, wherein the transmission is repeated within the system information window.

In some examples of the method, apparatuses, and non-transitory computer-readable medium described herein, the starting time for each of the corresponding physical downlink control channel monitoring occasions may be the same in different system information windows.

In some examples of the method, apparatuses, and non-transitory computer-readable medium described herein, the starting time for each of the corresponding physical downlink control channel monitoring occasions may be different in different system information windows.

Some examples of the method, apparatuses, and non-transitory computer-readable medium described herein may further include operations, features, means, or instructions for transmitting retransmissions of the physical downlink control channel and system information messages within the system information window.

In some examples of the method, apparatuses, and non-transitory computer-readable medium described herein, transmitting retransmissions of the physical downlink control channel and system information messages may include operations, features, means, or instructions for transmitting retransmissions of the physical downlink control channel that may be continuous in time with an initial transmission of the physical downlink control channel.

In some examples of the method, apparatuses, and non-transitory computer-readable medium described herein, transmitting retransmissions of the physical downlink control channel and system information messages may include operations, features, means, or instructions for transmitting retransmissions of the physical downlink control channel that may be non-continuous in time with an initial transmission of the physical downlink control channel.

Some examples of the method, apparatuses, and non-transitory computer-readable medium described herein may further include operations, features, means, or instructions for indicating, via the monitored physical downlink control channel, one or more physical downlink shared channel resource allocations for receipt of other system information.

In some examples of the method, apparatuses, and non-transitory computer-readable medium described herein, the one or more physical downlink shared channel resource allocations may be the same as corresponding resource allocations for physical downlink shared channel messages carrying remaining minimum system information associated with the SS/PBCH blocks which may be actually transmitted to the UE having a control resource set multiplexing pattern 1.

In some examples of the method, apparatuses, and non-transitory computer-readable medium described herein, the one or more physical downlink shared channel resource allocations may be the same as corresponding resource allocations for physical downlink shared channel messages carrying remaining minimum system information associated with the SS/PBCH blocks which may be actually transmitted to the UE based at least in part on a multiplexing pattern.

DETAILED DESCRIPTION

Figure 1:
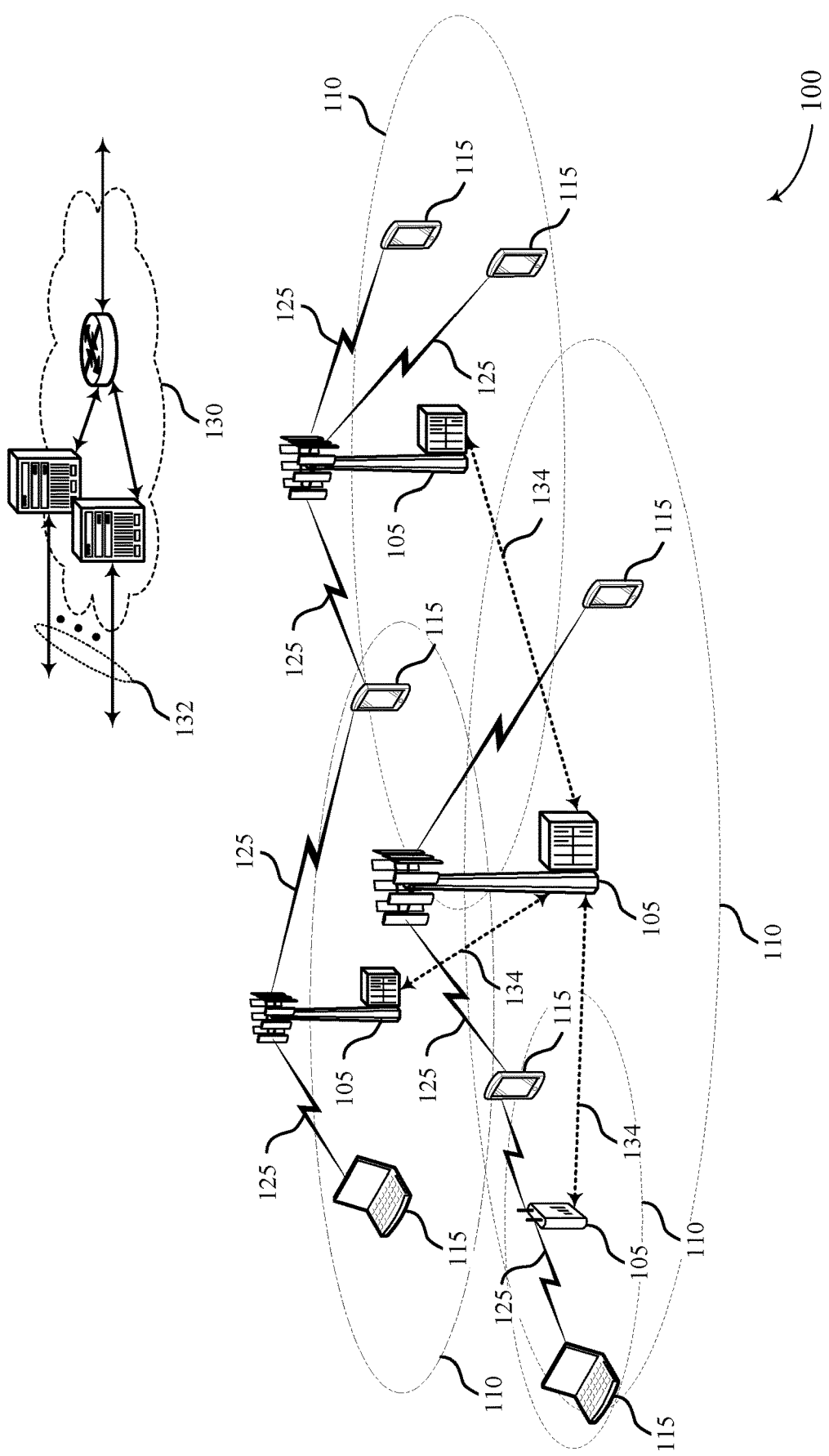
FIG. 1 illustrates an example of a system for wireless communications that supports beam-specific system information scheduling window design in accordance with aspects of the present disclosure.

A base station may transmit system information to a user equipment (UE). The system information may be related to cell access, scheduling information, radio resource configuration, etc. For example, the UE may wake up in the cell provided by a base station and may monitor for a synchronization signal/physical broadcast channel (SS/PBCH) block to receive system information and synchronization information from the base station. Based on the SS/PBCH block, the UE may decode a first system information block (SIB) message (e.g., a SIB1). In some cases, the SIB1 may include scheduling information for other system information (OSI). The OSI may be scheduled for transmission on a physical downlink shared channel (PDSCH) carrying system information (SI) messages by a PDCCH. An SI message may be periodically transmitted in an SI window, with one SI message per SI window. In some cases, a resource allocation for PDSCH carrying SI messages may be indicated to the UE via downlink control information (DCI) transmitted on a physical downlink control channel (PDCCH). Therefore, to identify and acquire the SI message resource allocations and receive system information, the UE may monitor PDCCH during an SI window for scheduling information for the PDSCH carrying the SI messages.

In some cases, the base station may support multi-beam transmission of SI messages. As such, the base station may perform beam sweeping and transmit an SI message in multiple different directions to provide system information to UEs in different locations. In some cases, based on beam sweeping the SI messages, the base station may configure a much larger SI window for transmitting the SI messages. However, a requirement for UEs served by the base station to monitor PDCCH for a longer SI window may increase the power used by those UEs, thereby reducing battery life.

To conserve power usage at the UEs, a UE may observe PDCCH monitoring occasions (PMOs) corresponding to different beams configured by the base station. A PMO may be a period during the SI window which corresponds to a PDCCH transmission associated with a specific beam. A PMO may correspond to specific time and frequency resources during which a UE can monitor for PDCCH carrying DCI. Therefore, the UE may identify a PMO in the SI window to monitor for PDCCH. In some cases, the PMOs may only correspond to actually transmitted SS/PBCH blocks. The base station may have multiple configured beams but may not transmit an SS/PBCH block on each configured beam. Instead, the base station may transmit SS/PBCH blocks on just a subset of all of the configured beams. In an example, a total of 64 beams may be supported in a relevant communication standard, but the base station may transmit an SS/PBCH block on just 16 of the 64 total beams. Thus, if the base station has a beam configured, but the base station does not use that beam, there may not be a PMO corresponding to that beam in the SI window. So, for the above example, there may be 16 PMOs instead of the total possible 64 PMOs.

In some cases, the UE may identify an association between an index of an actually transmitted SS/PBCH block and a monitoring window for PDCCH containing DCI used to schedule PDSCH carrying an SI message. For example, the UE may receive an SS/PBCH block and identify the index of the SS/PBCH block. For example, the index may indicate that the SS/PBCH block corresponds to the 15th beam of the 64 possible beams. Based on the indication of which SS/PBCH blocks are actually transmitted, the UE may determine that the 15th beam of the 64 total beams corresponds to the fourth actually transmitted SS/PBCH block (e.g., the base station may have transmitted an SS/PBCH block on each of the second beam, the 8th beam, the 11th beam, and now the 15th beam). The UE may then monitor the fourth PMO in the SI window to receive the PDCCH carrying the DCI. In some cases, the DCI may include a paging DCI, a broadcast OSI DCI, or both. In some cases, the association between an actually transmitted SS/PBCH and a monitoring window of a PDCCH containing the paging DCI and the broadcast DCI may be respectively configured via the SIB1, or remaining minimum system information (RMSI).

The base station and the UE may also implement techniques for SI message repetition or retransmission within an SI window. For example, the base station may transmit repetitions for a first PMO then switch to transmitting repetitions for a second PMO. Thus, the base station may transmit DCI associated with a first SS/PBCH block as part of a first PMO transmission, then the base station may switch to transmitting DCI associated with a second SS/PBCH block as part of a second PMO transmission. The base station may do this for each actually transmitted SS/PBCH block within the SI window. In another example, the base station may transmit a transmission for each PMO corresponding to an actually transmitted SS/PBCH block and repeat that transmission for the duration of the SI window. For example, the base station may configure a PMO for each actually transmitted SS/PBCH block and transmit PDCCH carrying DCI on the configured PMOs. So, if the base station actually transmitted 15 SS/PBCH blocks, the base station may transmit a group of 15 PMOs, one for each actually transmitted SS/PBCH blocks. After transmitting a PMO for reach actually transmitted SS/PBCH block, the base station may repeat this transmission, transmitting another repetition for each of the PMOs.

Aspects of the disclosure are initially described in the context of a wireless communications system. Aspects of the disclosure are further illustrated by and described with reference to apparatus diagrams, system diagrams, and flowcharts that relate to beam-specific system information scheduling window design.

FIG. 1 illustrates an example of a wireless communications system 100 that supports beam-specific system information scheduling window design in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may observe PMOs corresponding to different beams transmitted by a base station 105. A PMO may be a period during an SI window which corresponds to a PDCCH transmission associated with a specific beam. The PMO may include when the UE 115 starts to monitor PDCCH (e.g., the start of the PMO) and how long the UE 115 monitors for PDCCH (e.g., the duration of the PMO). There may be different types of PDCCHs. For example, some PMOs may be for monitoring PDCCH with DCI scheduling PDSCH carrying an SI message. A PDCCH with DCI scheduling PDSCH carrying an SI message may be referred to as a Type0A-PDCCH. The UE may be configured to monitor other PMOs for other types of PDCCH as well.

Therefore, the UE 115 may identify a PMO in the SI window to monitor PDCCH with DCI scheduling PDSCH carrying an SI message. In some cases, the PMOs may only correspond to actually transmitted SS/PBCH blocks. For example, the UE 115 may identify an association between an index of an actually transmitted SS/PBCH block and a corresponding PMO, during which the base station 105 transmits DCI to schedule PDSCH carrying an SI message. In some cases, the DCI may include a paging DCI, a broadcast OSI DCI, or both. In some cases, the association between an actually transmitted SS/PBCH and a PMO may be configured via the SIB1 or RMSI. The base station 105 and the UE 115 may also implement techniques for SI message repetition or retransmission within an SI window. For example, the base station 105 may transmit and retransmit (e.g., transmitting repetitions) for a first PMO then switch to transmitting repetitions for a second PMO. In another example, the base station 105 may transmit a transmission for each PMO corresponding to an actually transmitted SS/PBCH block and repeat that transmission for the duration of the SI window. Acronyms such as SI, SIB, SS/PBCH, PDCCH, PDSCH, PMO, and others are used merely for convenience and are not exclusively limited to a specific technology.

Figure 2:
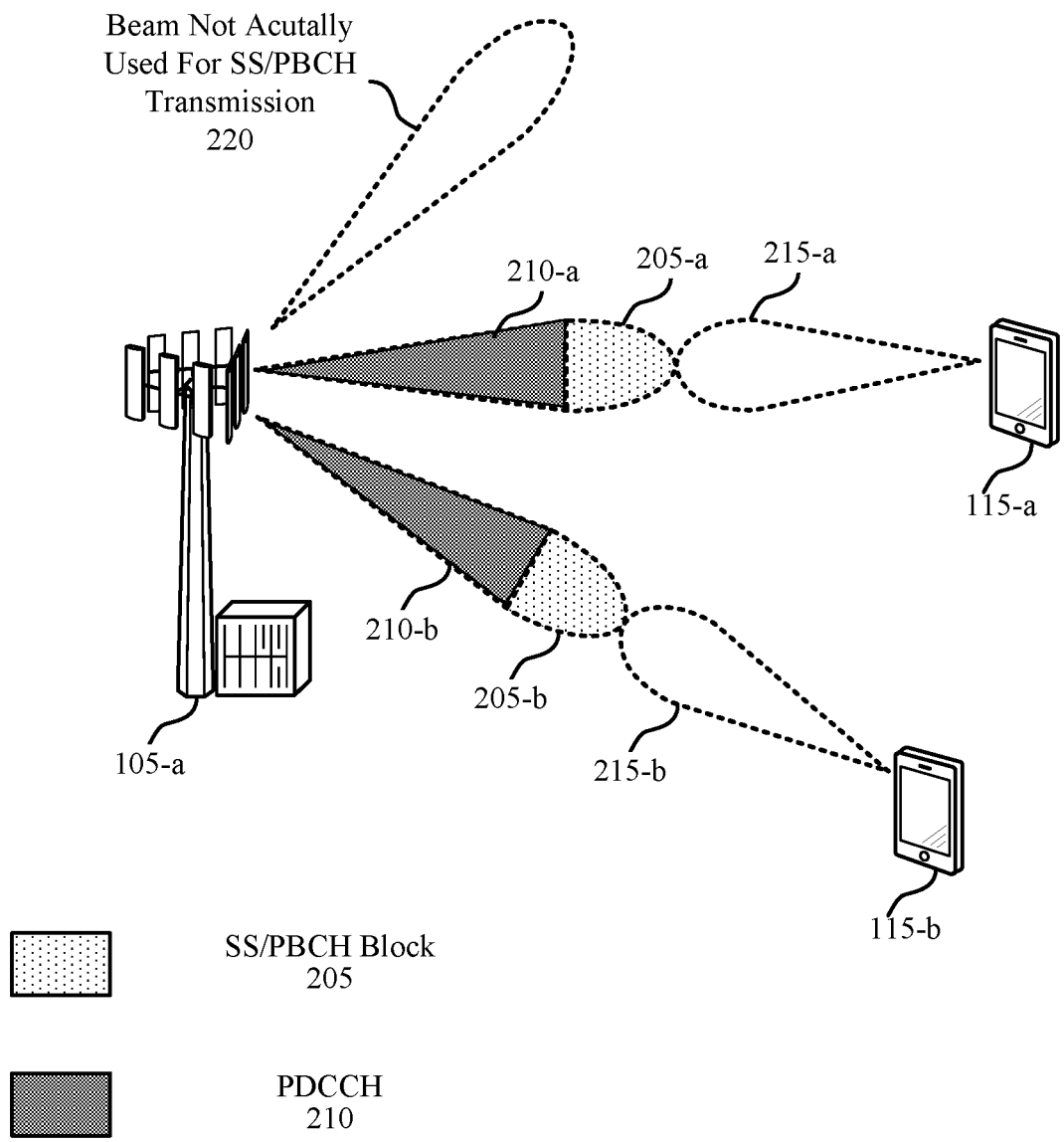
FIG. 2 illustrates an example of a wireless communications system that supports beam-specific system information scheduling window design in accordance with aspects of the present disclosure.

FIG. 2 illustrates an example of a wireless communications system 200 that supports beam-specific system information scheduling window design in accordance with aspects of the present disclosure. In some examples, wireless communications system 200 may implement aspects of wireless communication system 100. The wireless communications system 200 may include UE 115-a, UE 115-b, and base station 105-a, which may be respective examples of a UE 115 and a base station 105 as described in FIG. 1.

Base station 105-a may transmit system information to UEs 115. System information may include information related to cell access, scheduling information, radio resource configuration, etc. For example, a UE 115 which wakes up in the cell provided by base station 105-*a* may monitor for an SS/PBCH block 205 to receive system information and synchronization information from base station 105-*a*. The SS/PBCH block 205 may include a master information block (MIB), which includes information that the UE 115 uses to decode a first SIB. In some cases, the first SIB may be referred to as SIB1 or remaining minimum system information (RMSI). In some cases, a UE 115 may identify a window to monitor for SIB1 based on an index of a received SS/PBCH block 205.

In some cases, the SS/PBCH block 205 may be a directional (e.g., beamformed) transmission. For example, base station 105-*a* may transmit SS/PBCH block 205-*a* using a first beam in the direction of UE 115-*a*, and UE 115-*a* may use receive beam 215-*a* to receive SS/PBCH block 205-*a*. Base station 105-*a* may transmit SS/PBCH block 205-*b* use a second beam in the direction of UE 115-*b* (e.g., a different direction from UE 115-*a*), and UE 115-*b* may use receive beam 215-*b* to receive SS/PBCH block 205-*b*.

In some cases, SIB1 may include information related to other system information (OSI), which may be scheduled for transmission on a physical downlink shared channel (PDSCH) in system information (SI) messages. PDSCH may be an example of a shared downlink channel and may not be restricted to a specific wireless technology. For example, the SIB1 may include scheduling information for the OSI, a periodicity of the OSI, an SI window size, or other information. In some cases, SIB1 may include information for any one or more SIBs included in the OSI. For example, if there are 8 other SIBs included in the OSI (e.g., SIB2 through SIB9), the SIB1 may include information related to any one or more of those SIBs.

The SI messages carrying the OSI (e.g., SIB2 through SIB9) may be transmitted in SI windows. In some cases, there may be one SI message (e.g., one configuration of an SI message) per SI window. An SI message in an SI window may be retransmitted or repeated within the SI window. SIBs with aligning periodicities may be mapped into a same SI window. For example, if SIB2 has a periodicity of 40 ms and SIB 3 has a periodicity of 80 ms, SIB3 may be included in the same SI message as SIB2 every other time. The SI windows may have the same duration, but different SI messages carrying different system information may have different periodicities. In some cases, there may be a pre-configured set of SI messages. In some cases, there may be 32 different configurations of SI messages and SI windows.

In some cases, a resource allocation for SI messages may be indicated to a UE 115 via DCI transmitted on a PDCCH 210. Therefore, to identify and acquire the SI messages resource allocations and receive system information, the UE 115 may monitor for the PDCCH 210 carrying the PDSCH scheduling information. In some wireless communications systems, the UE 115 may receive a specific SIB by determining the start of an SI window associated with that SIB, then attempting to receive the PDCCH signal using a SI radio network temporary identifier (SI-RNTI) from the start of the SI window until either the complete SI message is received or the SI window expires. When UE 115-*a* identifies the grant, the UE 115 may attempt to decode PDSCH with the SI. UE 115-*a* may assume that, within the SI window, PDCCH for an SI message is transmitted in at least one PMO. If the SI message is not received by the end of the SI window, the UE 115-*a* may repeat the process at the next SI window corresponding to that SIB (e.g., based on the periodicity of the SIB). The scheduling information, periodicity, and SI window size may be, for example, indicated by the SIB1 described above. In some cases, PDCCH may be an example of a downlink control channel and may not be restricted to any specific wireless technology.

In some cases, a PDCCH 210 may be quasi co-located to a received SS/PBCH block 205. For example, a UE 115 may use a receive beam 215 which successfully received an SS/PBCH block 205 to attempt to receive a corresponding PDCCH 210 carrying DCI. In some cases, DCI may be the payload of the PDCCH 210, though the payload of the PDCCH 210 may in some cases be referred to as a PDCCH message.

Wireless communications system 200 may support multi-beam transmission of SI messages. In a wireless communications system supporting multi-beam transmission of SI messages, a base station 105-*a* may transmit using multiple beams in different beam directions. In some cases, the base station may perform beam sweeping and transmit an SI message in multiple different directions to provide system information to UEs in different locations (e.g., UE 115-*a* and UE 115-*b*). In some cases, base station 105-*a* may be capable of transmitting in up to 64 different beam directions, though base station 105-*a* may not actually transmit an SS/PBCH block 205 or SI message in each of those directions. For example, beam 220 may be configured for use by base station 105-*a*, but base station 105-*a* may not actually transmit an SS/PBCH block 205 on the beam 220.

Based on the beam sweeping of the SI messages, base station 105-*a* may configure a much larger SI windows for transmitting the SI messages. For example, base station 105-*a* may take longer to transmit the SI messages in multiple different directions compared to using one beam in other wireless communications systems. As such, UEs 115 served by base station 105-*a* would have a longer SI window to monitor for PDCCH, which may increase the power used by those UEs 115.

To conserve power usage and improve detection of PDCCH, the UEs 115 of wireless communications system 200 may only monitor for PDCCH during PMOs corresponding to actually transmitted SS/PBCH blocks 205. For example, UE 115-*a* may identify an association between an index (e.g., an SS block index) of SS/PBCH block 205-*a* and a monitoring window for PDCCH 210-*a* containing DCI used to schedule PDSCH for an SI message. In some cases, the DCI may include a paging DCI, a broadcast OSI DCI, or both. In some cases, the association between an actually transmitted SS/PBCH block 205 (e.g., SS/PBCH block 205-*a*) and a monitoring window of a PDCCH 210 (e.g., PDCCH 210-*a*) containing the paging DCI and the broadcast DCI may be respectively configured via RMSI (e.g., SIB1).

In some cases, the PMOs may be beam-specific, such that an SI window includes a number of PMOs, and each PMO corresponds to one actually transmitted SS/PBCH block 205. In some cases, an actually transmitted SS/PBCH block 205 may be used to distinguish over an SS/PBCH block which may be configured or scheduled but not transmitted by base station 105-*a*. Thus, even if base station 105-*a* is configured to use the beam 220, if base station 105-*a* does not transmit an SS/PBCH block on beam 220, there may not be a PMO associated with the beam 220 in the SI window. This may reduce the duration of the SI window to conserve power. Or, the described techniques may enable base station 105-*a* to transmit additional SI message repetitions to improve the likelihood that a UE 115 receives the SI message, such that the UE 115 does not stay active to attempt to receive the SI message in a later corresponding SI window if the SI message is not successfully received the first time.

For example, UE 115-*a* may receive SS/PBCH block 205-*a* and decode a SIB1 based on a MIB included in SS/PBCH block 205-*a*. UE 115-*a* may identify a PMO corresponding to SS/PBCH block 205-*a*, during which UE 115-*a* may monitor PDCCH 210-*b*. UE 115-*a* may identify a starting time (e.g., a starting slot or frame) for the PMO based on parameters such as the index of SS/PBCH block 205-*a*, an SI timing window (e.g., the starting time of the SI window), the PMO duration, and the number of PMOs within a radio frame, among other configurations. These configurations may be determined based on information in the MIB, information in the SIB1 (e.g., RMSI), a quasi co-location association between PDCCH 210-*a* and SS/PBCH block 205-*a*, or any combination thereof. Based on identifying the PMO associated with PDCCH 210-*a* and a starting time of the PMO, UE 115-*a* may search over a duration which may be much shorter than the SI window duration.

Base station 105-*a* and the UEs 115 may implement techniques for SI message retransmission within an SI window. For example, the base station may transmit repetitions of DCI for a first PMO then switch to transmitting repetitions of DCI for a second PMO. Thus, base station 105-*a* may continuously transmit DCI associated with a first SS/PBCH block (e.g., consecutively on contiguous PDCCH resources), then switch to continuously transmitting DCI associated with a second SS/PBCH block. Base station 105-*a* may do this for each actually transmitted SS/PBCH block within the SI window. This example is further described in FIG. 5A.

In another example, base station 105-*a* may transmit a transmission for each PMO corresponding to an actually transmitted SS/PBCH block and repeat that transmission for the duration of the SI window. For example, a downlink control channel for each PMO corresponding to an actually transmitted SS/PBCH block may be multiplexed into a transmission. Base station 105-*a* may then transmit repetitions of the transmissions. In some cases, the transmission may be repeated for the duration of an SI window. In this example, base station 105-*a* may perform beam sweeping across the PMOs prior to retransmitting. This example is further described by FIG. 5B. The technique for SI message repetition may be signaled by base station 105-*a*, or the technique may be configured based on network implementation (e.g., without signaling).

A PDSCH resource allocation for the SI messages may be signaled by a DCI payload of the PDCCH 210. In some cases, the PDSCH resource allocation may be the same as the PDSCH resource allocation for a PDSCH carrying SIB1 with a SS/PBCH block and control resource set multiplexing pattern 1 (e.g., TDM). In some cases, this may be a default for a signal with a normal cyclic prefix. In some cases, the same design may be applied for paging.

Figure 3:
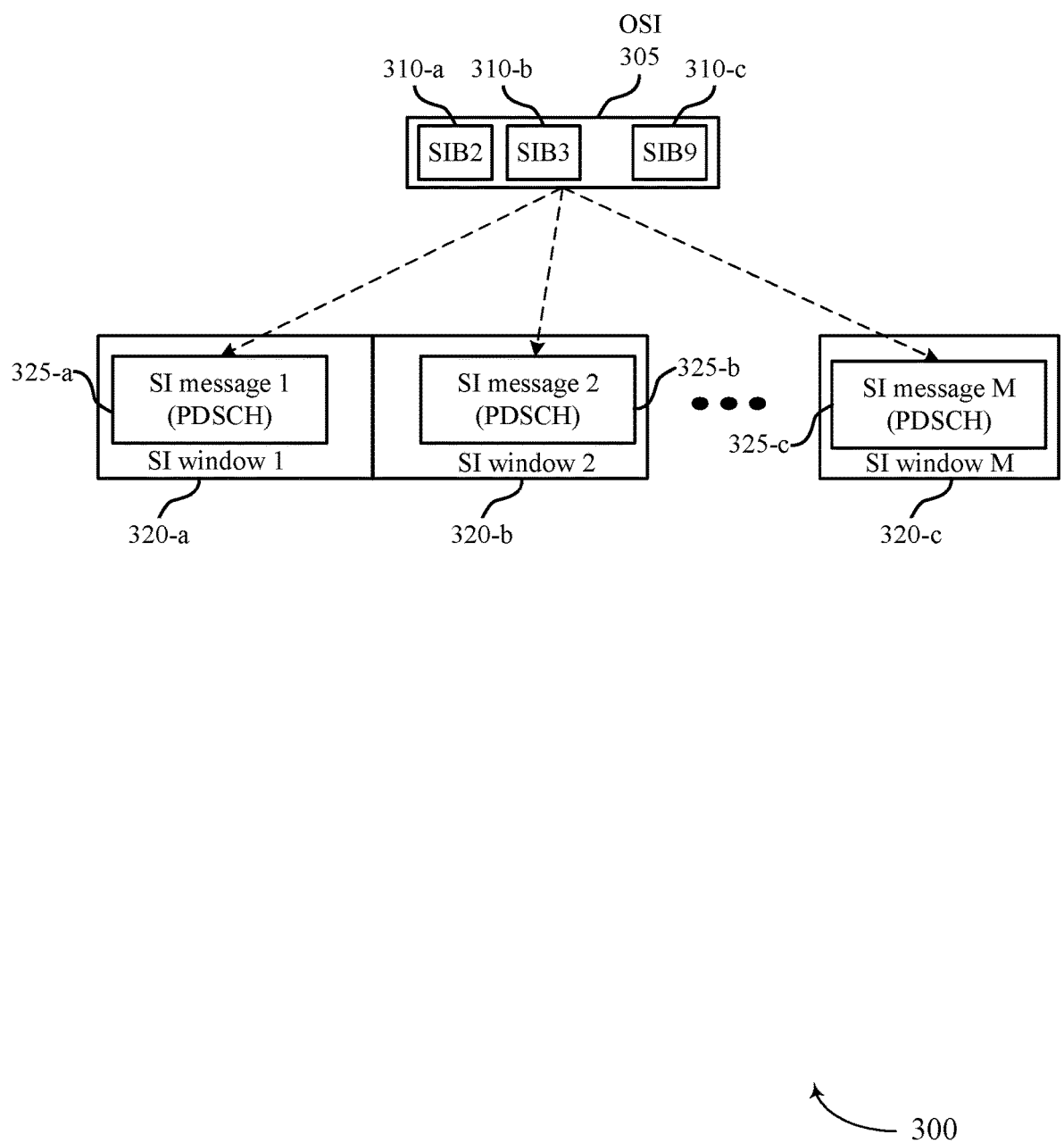
FIG. 3 illustrates an example of a system information block (SIB) mapping that supports beam-specific system information scheduling window design in accordance with aspects of the present disclosure.

FIG. 3 illustrates an example of a SIB mapping 300 that supports beam-specific system information scheduling window design in accordance with aspects of the present disclosure. In some examples, SIB mapping 300 may implement aspects of wireless communication system 100.

In some cases, there may be multiple different types of SIBs (e.g., SIB1 through SIB9), where different SIBs carry different system information. For example, SIB1 may carry scheduling information for other SIBs, where the other SIBs (e.g., SIB2 through SIB9) may carry additional system information used by a UE 115. In some cases, SIB1 may be referred to as RMSI. In some cases, SIB2 310-*a* through SIB9 310-*c* may be referred to as other system information (e.g., OSI 305). The OSI 305 may include other sets or numbers of SIBs. For example, there may be more or less than 8 SIBs in OSI in other configurations.

In some cases, SI windows 320 may have the same duration, but may have different periodicities. For example, SI window 320-*a* may have the same duration as SI window 320-*b*. There may be one SI message 325 per SI window 320, but that SI message 325 may be repeated within the SI window 320. For example, SI message 325-*a* may be repeated in SI window 320-*a*. In some cases, retransmissions of the SI messages 325 may have different redundancy versions but carry the same payload. A base station 105 may transmit repetitions of the SI message 325 in different beam directions (e.g., corresponding to different SS/PBCH blocks) within the SI window 320.

The SIBs included in OSI 305 are placed within SI messages 325 and are a part of a PDSCH signal as described in to FIGS. 1 and 2. SI messages 325 may be transmitted within an SI window 320 (e.g., SI message 325-*a* in SI window 1 320-*a*). In some cases, there may be up to a set number of SI windows 320 (e.g., 32 SI windows) for transmission of system information to a UE 115 by a base station 105. In some cases, each SIB may have a periodicity based on the number of SI windows 320.

In one example, SIB2 310-*a* may be transmitted every 20 ms, where SIB3 310-*b* may be transmitted every 60 ms. Therefore, every third SI message may carry both SIB2 310-*a* and SIB3 310-*b*, for example. In some cases, the length of an SI window may be given by a parameter configured by the PBCH, such as "SI-WindowLength."

Figure 4:
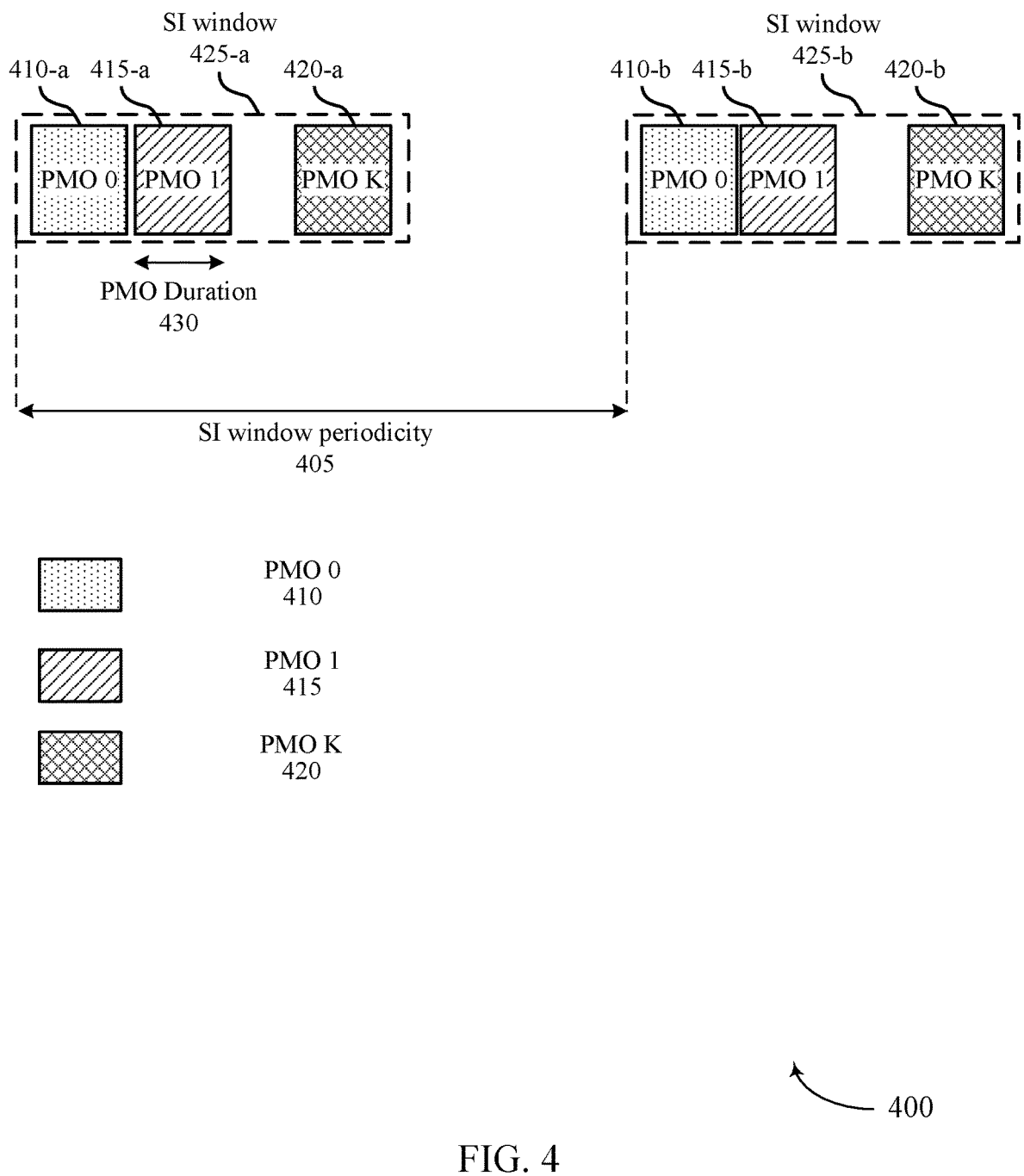
FIG. 4 illustrates an example of a system information (SI) window that supports beam-specific system information scheduling window design in accordance with aspects of the present disclosure.

FIG. 4 illustrates an example of an SI window 400 that supports beam-specific system information scheduling window design in accordance with aspects of the present disclosure. In some examples, SI window 400 may implement aspects of wireless communication system 100.

In some cases, a base station 105 may perform beam sweeping while transmitting an SI message. For example, base station 105-*a* of wireless communications system 200 may perform beam sweeping. In some examples of beam sweeping an SI message, a corresponding SI window (e.g., an SI window 425) may greatly increase when compared to using a single beam, as the base station 105 may use one SI window 425 common for all beams transmitting the SI message. Thus, the base station 105 may increase the size of the SI window 425 to transmit the SI message in the different directions. Thus, UEs 115 of other wireless communications systems may monitor the entire SI window 425 to receive the SIB. Monitoring the entire SI window 425 may increase power consumption, especially if the UE does not detect the SI message.

However, in a wireless communications systems in accordance with one or more aspects of the present disclosure, a UE 115 may observe PMOs in the SI window which correspond to actually transmit SS/PBCH blocks. Therefore, a UE 115 reduces power consumption when receiving OSI from a base station 105.

For example, a UE 115 may observe PMOs in SI window 425 based on information included in a SIB1 or RMSI. In some cases, each PMO corresponds to a beam configured for use by a base station 105. A PMO may be a period during which the UE 115 may perform PDCCH decoding in an attempt to receive scheduling information (e.g., paging DCI and a broadcast OSI DCI) for PDSCH, on which the base station 105 may transmit an SI message. In some cases, the SI window may be common for all beams transmitting an SI message. Within the SI window, the UE 115 may observe PMOs corresponding to respective receive beams. An SI window 425 may have an SI window periodicity 405, where an SI message corresponding to the SI window 425 is transmitted again after the SI window periodicity 405. For example, SI window 425-*a* includes PMO 0 410-*a* and PMO 1 415-*a* through PMO K 420-*a*. After the SI window periodicity 405, the SI window 425 is repeated (e.g., at SI window 425-*b*), which includes PMO 0 410-*b* and PMO 1 415-*b* through PMO K 420-*b*.

In some cases, there may be multiple PMOs corresponding to multiple different beam directions, even if the base station does not actually transmit an SS/PBCH block or SI message in each of those directions. For example, the base station may be capable of transmitting in 64 different directions but may actually transmit an SS/PBCH block in 16 of those directions. In some cases, this may still increase a monitoring duration for the UE 115, as one or more PMOs in the SI window may not be used to transmit system information.

Therefore, in some examples, the PMOs in the SI window 425 may be beam-specific and relate to an actually transmitted SS/PBCH block. As such, an SI window 425 may include as many PMOs as there are actually transmitted SS blocks, and each PMO may correspond to one actually transmitted SS/PBCH block. Therefore, there may only be PMOs corresponding to actually transmitted SS/PBCH blocks, which may reduce the size of the SI window 425 and assist the UE 115 in conserving power while PDCCH monitoring. The UE 115 may receive an SS/PBCH block, identify a PMO associated with the received SS/PBCH block, and attempt to decode a PDCCH signal during the PMO by using the receive beam used to receive the SS/PBCH block. In some cases, the UE 115 may identify the PMO associated with the received SS/PBCH block based on a SIB1 or RMSI.

In some cases, the UE 115 may identify a starting time to monitor a PMO corresponding to a received SS/PBCH block. The starting time (e.g., the starting slot or frame) for a PMO can depend on parameters such as the index of the transmitted SS/PBCH block, SI window timing (e.g., the starting time of the SI window), PMO duration 430, the number of PMOs within a radio frame, or any combination thereof. These configurations may be indicated or based upon information in a SIB1 or RMSI. Thus, the UE 115 may not monitor PDCCH during each PMO and instead monitor PDCCH in PMOs which correspond to a successfully received SS/PBCH block. For example, if a base station 105 transmits an SS/PBCH block and SI message in a direction which points opposite to the UE 115, the UE 115 may not receive the SS/PBCH block or monitor for the SI message during a PMO corresponding to that SS/PBCH block and direction.

In an example, a UE 115 may receive an SS/PBCH block containing a MIB and use the information in the MIB to decode a SIB1. The SIB1 may including information related to PMOs in the SI window 425-*a*. The UE 115 may identify that PMO 1 415-*a* corresponds to the received SS/PBCH block. The UE 115 may identify a starting time of PMO 1 415-*a*, for example based on information included in SIB1. For example, there may be an association between the index of the SS/PBCH block and PMO 1 415-*a*. Additionally, or alternatively, the UE 115 may determine characteristics of PMO 1 415-*a* based on a quasi co-location between the received SS/PBCH block and a PDCCH used to carry a PDCCH signal during PMO 1 415-*a*. For example, UE 115 may determine an association between an index of the SS/PBCH block and the monitoring window of PMO 1 415-*a* or determine a receive beam to use for PMO 1 415-*a* based on the relationship. In some cases, the signaling may be done through a bitmap in the RMSI, transmitted to the UE 115 by the network, indicating which SS/PBCH blocks are transmitted.

Figure 5A:
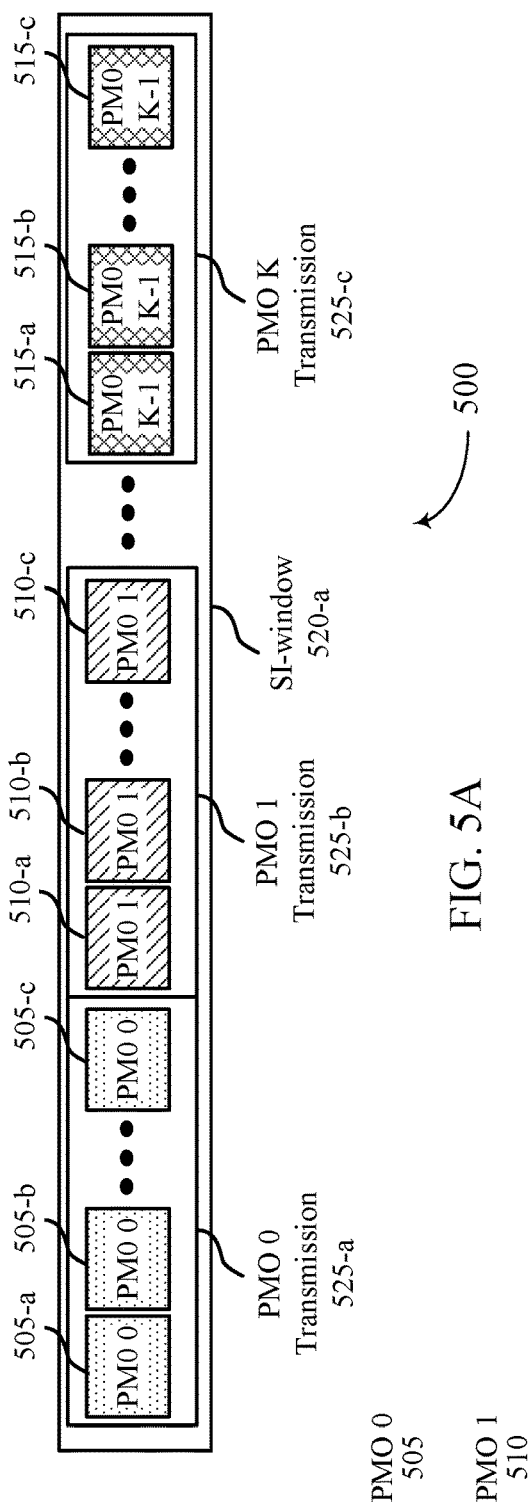
FIGS. 5A and 5B illustrate examples of SI message repetitions that support beam-specific system information scheduling window design in accordance with aspects of the present disclosure.
Figure 5B:
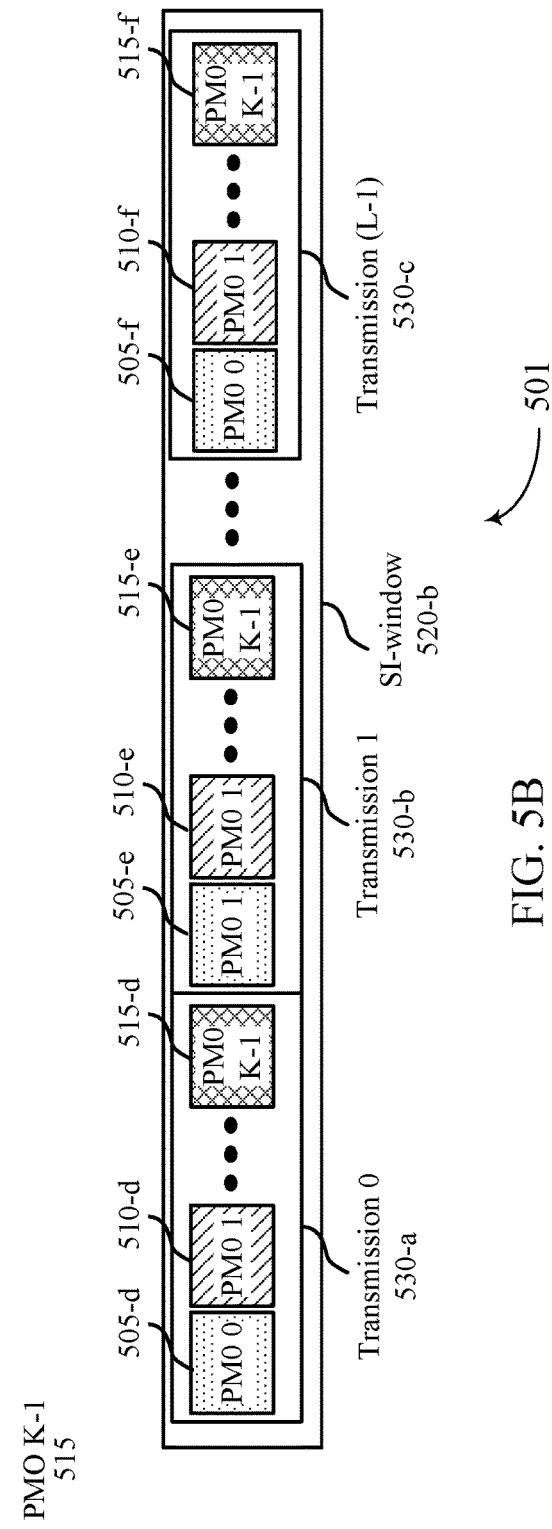

FIGS. 5A and 5B illustrate examples of SI message repetition schemes 500 and 501 that supports beam-specific system information scheduling window design in accordance with aspects of the present disclosure. In some examples, SI message repetition schemes 500 and 501 may implement aspects of wireless communication system 100.

As described in FIG. 2, PMOs in an SI window 520 may only correspond to actually transmitted SS/PBCH blocks. Thus, even if a base station 105 is configured to use a beam, if the base station 105 does not transmit an SS/PBCH block on that beam, there may not be a PMO associated with that beam in the SI window. In some cases, this may reduce the duration of the SI window to conserve power. Additionally, or alternatively, the base station 105-*a* may transmit SI message repetitions or retransmissions to improve the likelihood that a UE 115 receives the SI message (e.g., to improve a link budget). The SI message repetition schemes 500 and 501 describe techniques for transmitting retransmissions of an SI message. The number of transmissions or PMOs within an SI window 520 may be based on a PMO duration, SI window duration, and number of actually transmitted SS/PBCH blocks. These may be indicated in a SIB1 or via RMSI. Therefore, a UE 115 served by the base station 105 may identify both K and L values, where K corresponds to the number of PMOs and L corresponds to the number of repetitions. The number of actual SI message transmissions within a PMO may be determined by base station 105 or the network. In some cases, the technique used may be signaled by the base station 105 to the UEs 115, for example by a SIB1 or RMSI.

In FIG. 5A, the base station 105 may transmit a transmission 525 including repetitions of a first PMO then switch to a transmission 525 including repetitions of a second PMO. For example, PMO 0 transmission 525-*a* may include L repetitions of PMO 0 505 (e.g., PMO 0 505-*a* and PMO 0 505-*b* through PMO 0 505-*c*). After the L repetitions of PMO 0 505, the base station may switch to PMO 1 transmission 525-*b*, which includes L transmissions of PMO 1 510. The base station 105 may transmit as many PMO transmissions 525 as there are actually transmitted SS/PBCH blocks, where each PMO transmission 525 corresponds to one actually transmitted SS/PBCH block. Therefore, each PMO transmission 525 may be transmitted in a slightly different direction, such that the base station 105 performs one beam sweep over the entire duration of SI window 520-*a*. In this example, the UE 115 may monitor retransmissions of the PDCCH, and in some cases system information messages, that are continuous in time with an initial transmission of the PDCCH. The retransmissions of PDCCH may be transmitted on contiguous, or back-to-back, resources in the time domain. For example, retransmissions which are continuous in time may be consecutive to the initial transmission. In some cases, the continuous retransmissions may be transmitted based on a first PMO consecutively (e.g., back to back) without transmitting based on a second PMO. In some cases, the UE 115 may stop monitoring after all concerned PMOs and retransmissions are completed.

In FIG. 5B, the base station 105 may transmit a transmission 530 with each PMO corresponding to an actually transmitted SS/PBCH block, then repeat that transmission 530 for the duration of the SI window 520. For example, the base station 105 may perform beam sweeping on each configured control channel first. The base station 105 may transmit a control channel during PMOs for each beam corresponding to an actually transmitted SS/PBCH block prior to performing retransmissions. Then, if repetition is to occur (e.g., retransmissions), the base station 105 may transmit the retransmissions after the initial beam swept transmission. For example, Transmission 0 530-*a* may include each PMO corresponding to an actually transmitted SS/PBCH block. For example, transmission 0 530-*a* may include PMO 0 505-*d* and PMO 1 510-*d* through PMO K 515-*d*. When transmission 0 530-*a* is complete, it may be repeated as transmission 1 530-*b* immediately after. Thus, transmission 1 530-*b* may include the same contents as transmission 0 530-*a*, but may have a different value for the redundancy version indicator.

The transmission 530 may be repeated L times during SI window 520-*b*. In some cases, the transmission 530 may be repeated for the duration of SI window 520-*b*. In this example, the UE 115 may monitor retransmissions of the PDCCH and system information messages that are non-continuous in time with an initial transmission of the PDCCH. For example, the retransmissions may be transmitted after the base station iterates through each of the PMOs. In some cases, the UE 115 may refrain from monitoring in between the transmissions and retransmissions. In some cases, the non-continuous retransmissions may have a gap between the retransmissions, during which transmissions based on each of the other PMOs are made. For example, the base station 105 may transmit PDCCH based on a first PMO then transmit PDCCH based on a second PMO consecutive to the PDCCH based on the first PMO. The base station 105 may transmit PDCCH once for each actually transmitted SS/PBCH block before retransmitting a PDCCH. In some cases other variations of non-consecutive transmissions may be implemented.

Figure 6:
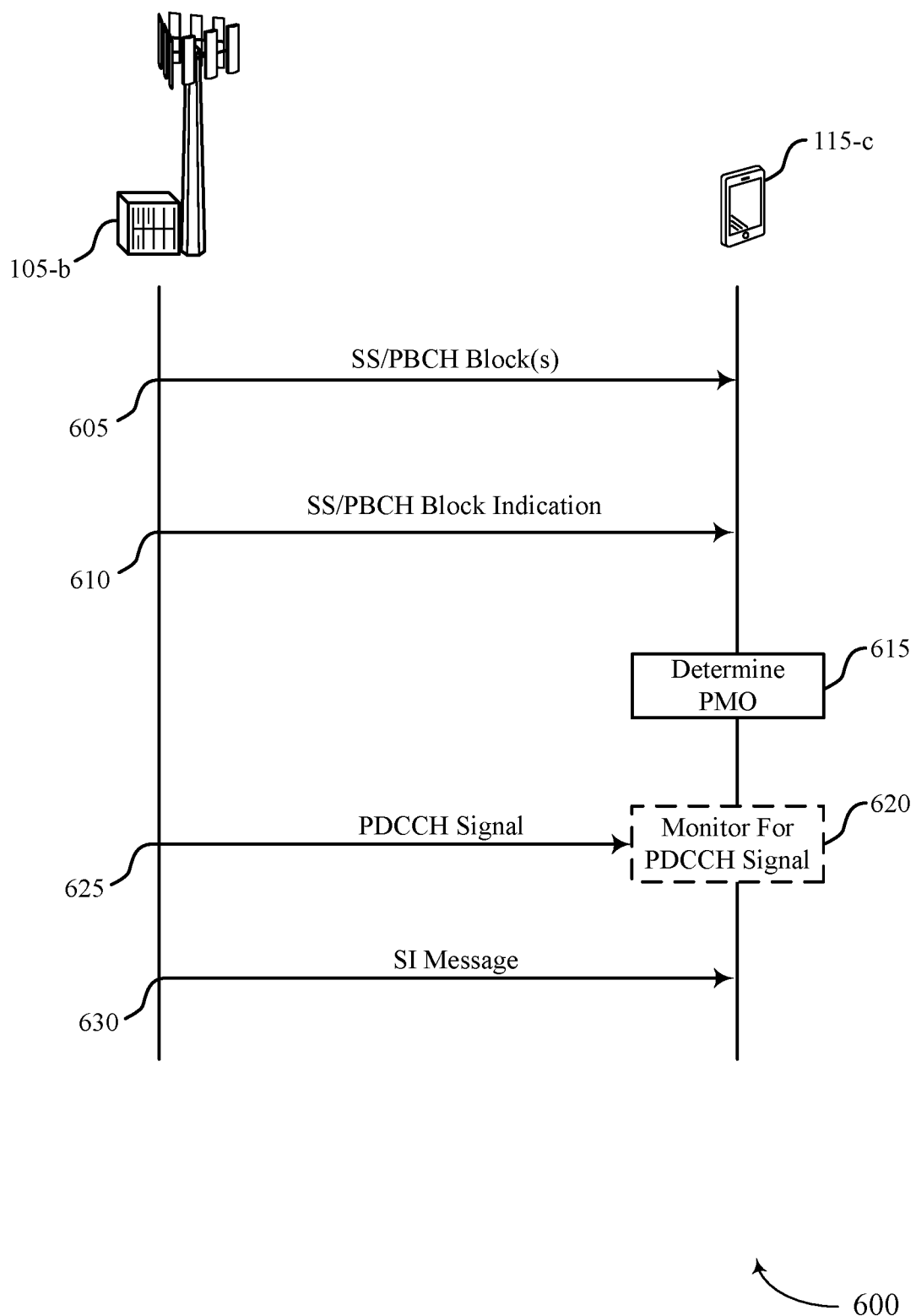
FIG. 6 illustrates an example of a process flow that supports beam-specific system information scheduling window design in accordance with aspects of the present disclosure.

FIG. 6 illustrates an example of a process flow 600 that supports beam-specific system information scheduling window design in accordance with aspects of the present disclosure. In some examples, process flow 600 may implement aspects of wireless communication system 100. Process flow 600 may include UE 115-*c* and base station 105-*b*, which may be respective examples of a UE 115 and a base station 105 as described herein.

Base station 105-*b* may determine, based on SS/PBCH blocks which are actually transmitted, corresponding PMOs within a system information window. Base station 105-*b* may transmit an SS/PBCH block to UE 115-*c* at 605. In some cases, the SS/PBCH block may include a MIB, which may carry information UE 115-*c* can use to decode a SIB1 or receive RMSI.

At 610, base station 105-*b* may transmit, to UE 115-*c*, an indication of which SS/PBCH blocks are actually transmitted. UE 115-*c* may receive the indication of which SS/PBCH blocks are actually transmitted by base station 105-*b*. In some cases, the indication may be of which SS/PBCH blocks have actually been transmitted, or of which SS/PBCH blocks will actually be transmitted in a following SS/PBCH burst. In some cases, receiving the indication includes receiving an index of each actually transmitted SS/PBCH block via a SIB1. In some examples, the indication may be transmitted via, or be an example of, a SIB1 or RMSI.

At 615, UE 115-*c* may determine a starting time within the system information window for each of the corresponding PMOs. In some cases, UE 115-*c* may determine the starting time for each of the corresponding physical downlink control channel monitoring occasions based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof. In some examples, the starting time for each of the corresponding PMOs is the same in different system information windows. In some other examples, the starting time for each of the corresponding PMOs may be different in different system information windows.

At 620, UE 115-*c* may monitor a PDCCH within the system information window during the corresponding PMOs. At 625, base station 105-*b* may transmit the PDCCH within the system information window during the corresponding PMOs.

The PDCCH signal may carry DCI including scheduling information for the SI messages. In some cases, UE 115-*c* may identify, via the monitored PDCCH, one or more PDSCH resource allocations for receipt of other system information. At 630, UE 115-*c* may receive the SI message carrying the other system information based on identifying the PDSCH resource allocations.

In some cases, UE 115-*c* may monitor retransmissions of the PDCCH and system information messages within the system information window. For example, UE 115-*c* may monitor retransmissions of the PDCCH and system information messages that are continuous in time (e.g., transmitted on contiguous time-domain resources) with an initial transmission of the PDCCH. This example is further described in FIG. 5A. In another example, UE 115-*c* may monitor retransmissions of the physical downlink control channel that are non-continuous in time with an initial transmission of the physical downlink control channel. This example is further described in FIG. 5B. In some cases, UE 115-*c* may monitor retransmissions of the physical downlink control channel and system information messages that are non-continuous in time with an initial transmission of the physical downlink control channel.

Figure 7:
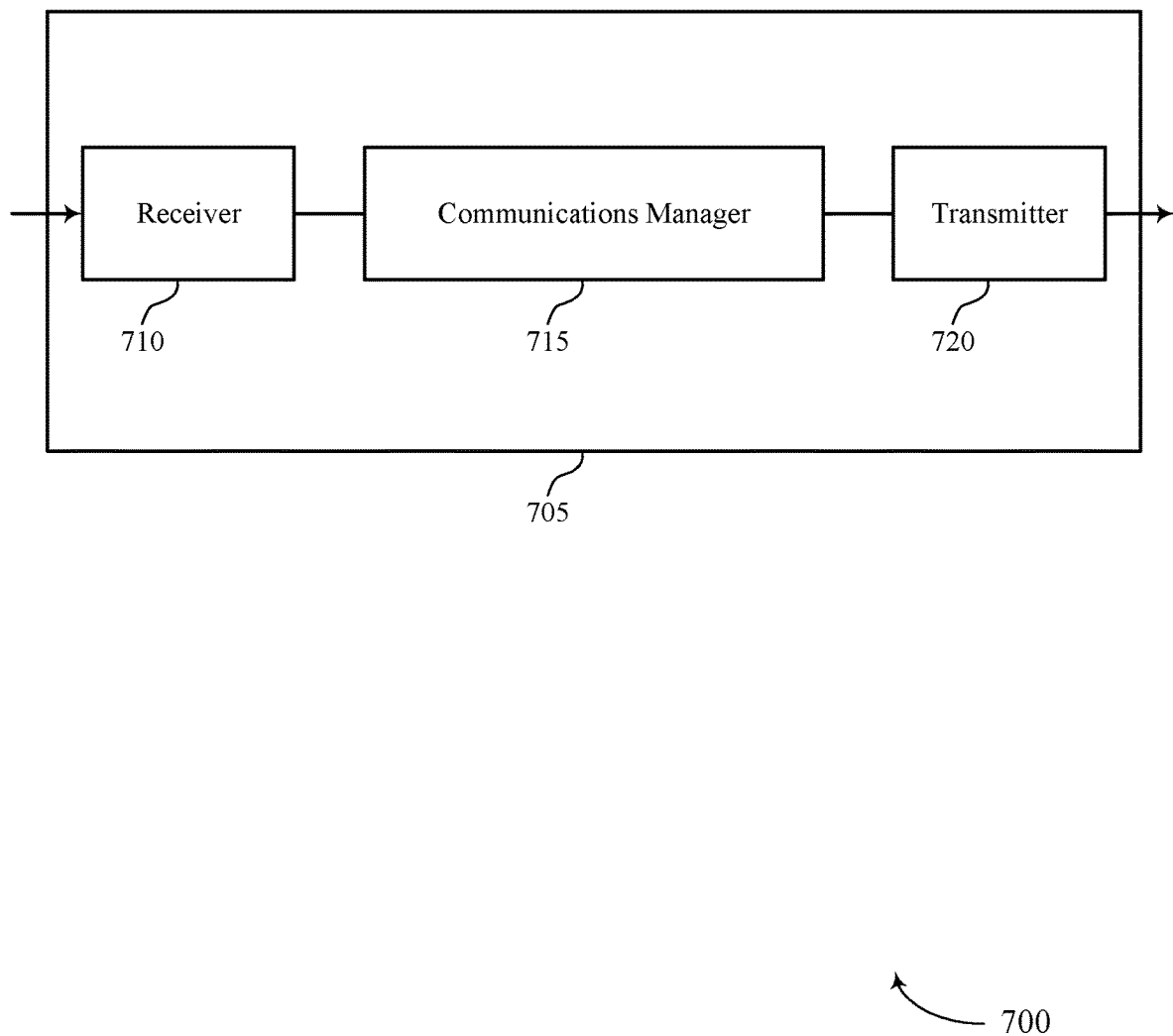
FIGS. 7 and 8 show block diagrams of devices that support beam-specific system information scheduling window design in accordance with aspects of the present disclosure.

FIG. 7 shows a block diagram 700 of a device 705 that supports beam-specific system information scheduling window design in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to beam-specific system information scheduling window design, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station that transmits SS/PBCH blocks, an indication of which SS/PBCH blocks are actually transmitted by the base station, determine, based on the indication, corresponding physical downlink control channel monitoring occasions within a system information window, and monitor a physical downlink control channel within the system information window during the corresponding physical downlink control channel monitoring occasions. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
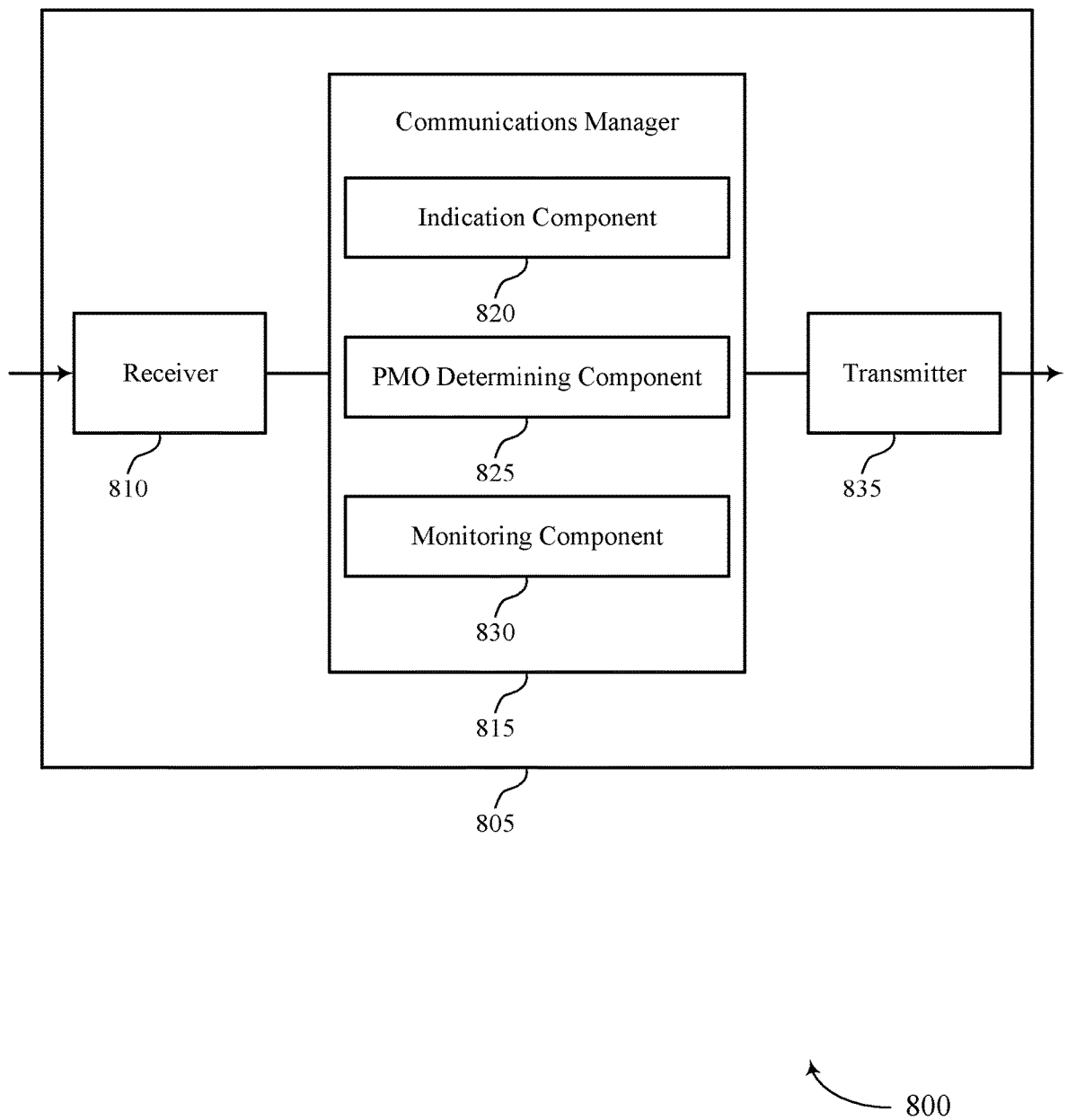

FIG. 8 shows a block diagram 800 of a device 805 that supports beam-specific system information scheduling window design in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to beam-specific system information scheduling window design, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an indication component 820, a PMO determining component 825, and a monitoring component 830. The communications manager 815 may be an example of aspects of the communications manager 1010 described herein.

The indication component 820 may receive, from a base station that transmits SS/PBCH blocks, an indication of which SS/PBCH blocks are actually transmitted by the base station. The PMO determining component 825 may determine, based on the indication, corresponding physical downlink control channel monitoring occasions within a system information window. The monitoring component 830 may monitor a physical downlink control channel within the system information window during the corresponding physical downlink control channel monitoring occasions.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
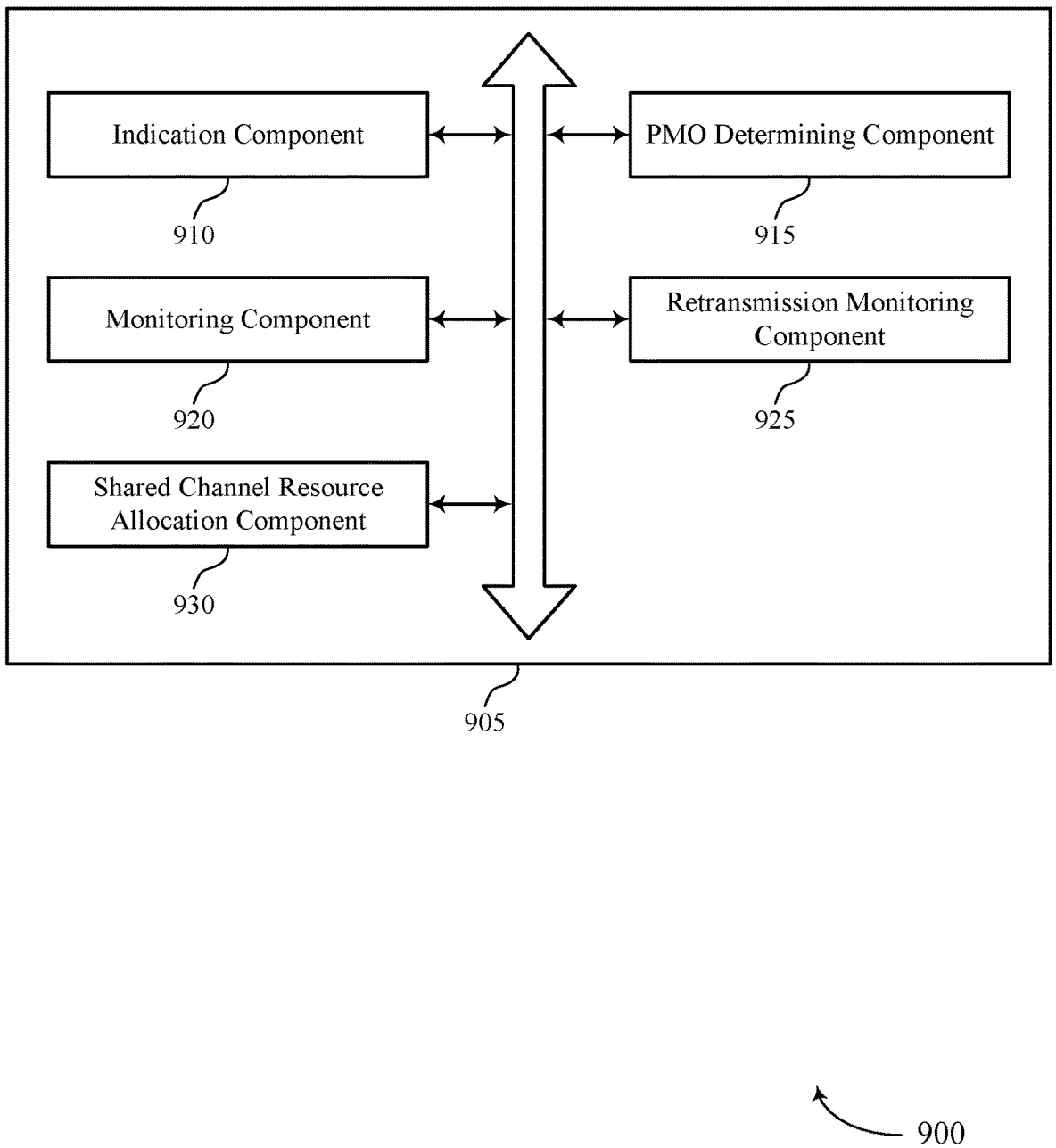
FIG. 9 shows a block diagram of a communications manager that supports beam-specific system information scheduling window design in accordance with aspects of the present disclosure.

FIG. 9 shows a block diagram 900 of a communications manager 905 that supports beam-specific system information scheduling window design in accordance with aspects of the present disclosure. The communications manager 905 may be an example of aspects of a communications manager 715, a communications manager 815, or a communications manager 1010 described herein. The communications manager 905 may include an indication component 910, a PMO determining component 915, a monitoring component 920, a retransmission monitoring component 925, and a shared channel resource allocation component 930. Each of these modules may communicate, directly or indirectly, with one another (e.g., via one or more buses).

The indication component 910 may receive, from a base station that transmits SS/PBCH blocks, an indication of which SS/PBCH blocks are actually transmitted by the base station. In some examples, the indication component 910 may receive an index of each actually transmitted SS/PBCH block, a duration for the physical downlink control channel monitoring occasions, a duration of the system information window, a number of actually transmitted SS/PBCH blocks, or any combination thereof, via a SIB1.

The PMO determining component 915 may determine, based on the indication, corresponding physical downlink control channel monitoring occasions within a system information window. In some examples, the PMO determining component 915 may determine a starting time within the system information window for each of the corresponding physical downlink control channel monitoring occasions.

In some examples, the PMO determining component 915 may determine the starting time for each of the corresponding physical downlink control channel monitoring occasions is based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof. In some cases, the starting time for each of the corresponding physical downlink control channel monitoring occasions is the same in different system information windows. In some cases, the starting time for each of the corresponding physical downlink control channel monitoring occasions is different in different system information windows.

The monitoring component 920 may monitor a physical downlink control channel within the system information window during the corresponding physical downlink control channel monitoring occasions.

The retransmission monitoring component 925 may monitor retransmissions of the physical downlink control channel and system information messages based on a multiplexing of the physical downlink control channel monitoring occasions into a transmission, where the transmission is repeated within the system information window.

The retransmission monitoring component 925 may monitor retransmissions of the physical downlink control channel and system information messages within the system information window. In some examples, the retransmission monitoring component 925 may monitor retransmissions of the physical downlink control channel that are continuous in time with an initial transmission of the physical downlink control channel. In some examples, the retransmission monitoring component 925 may monitor retransmissions of the physical downlink control channel that are non-continuous in time with an initial transmission of the physical downlink control channel.

The shared channel resource allocation component 930 may identify, via the monitored physical downlink control channel, one or more physical downlink shared channel resource allocations for receipt of other system information. In some cases, the one or more physical downlink shared channel resource allocations are the same as corresponding resource allocations for physical downlink shared channel messages carrying remaining minimum system information associated with the SS/PBCH blocks which are actually transmitted by the base station having a control resource set multiplexing pattern 1. In some cases, the one or more physical downlink shared channel resource allocations are the same as corresponding resource allocations for physical downlink shared channel messages carrying remaining minimum system information associated with the SS/PBCH blocks which are actually transmitted by the base station based on a multiplexing pattern.

Figure 10:
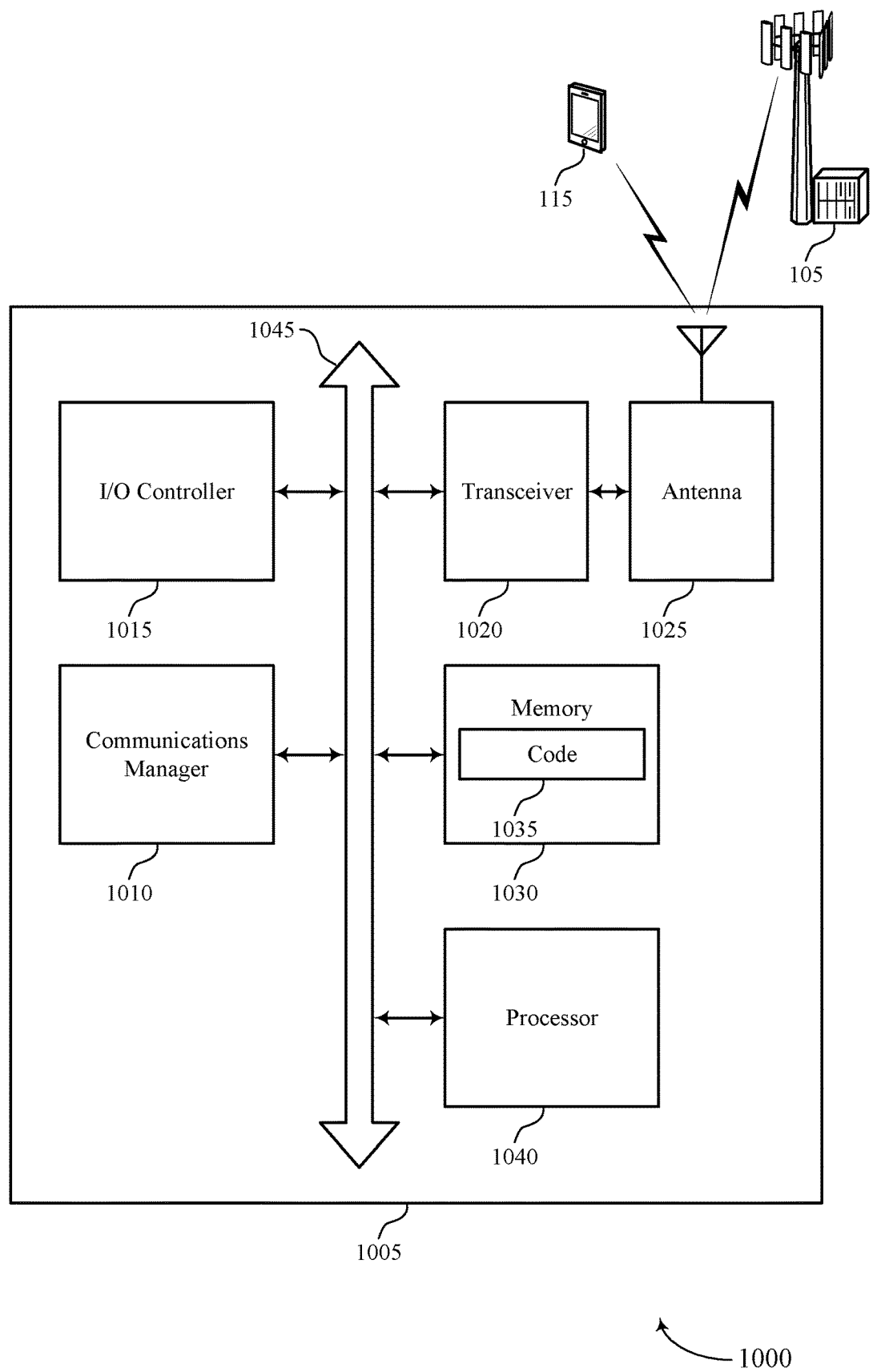
FIG. 10 shows a diagram of a system including a device that supports beam-specific system information scheduling window design in accordance with aspects of the present disclosure.

FIG. 10 shows a diagram of a system 1000 including a device 1005 that supports beam-specific system information scheduling window design in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station that transmits SS/PBCH blocks, an indication of which SS/PBCH blocks are actually transmitted by the base station, determine, based on the indication, corresponding physical downlink control channel monitoring occasions within a system information window, and monitor a physical downlink control channel within the system information window during the corresponding physical downlink control channel monitoring occasions.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam-specific system information scheduling window design).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
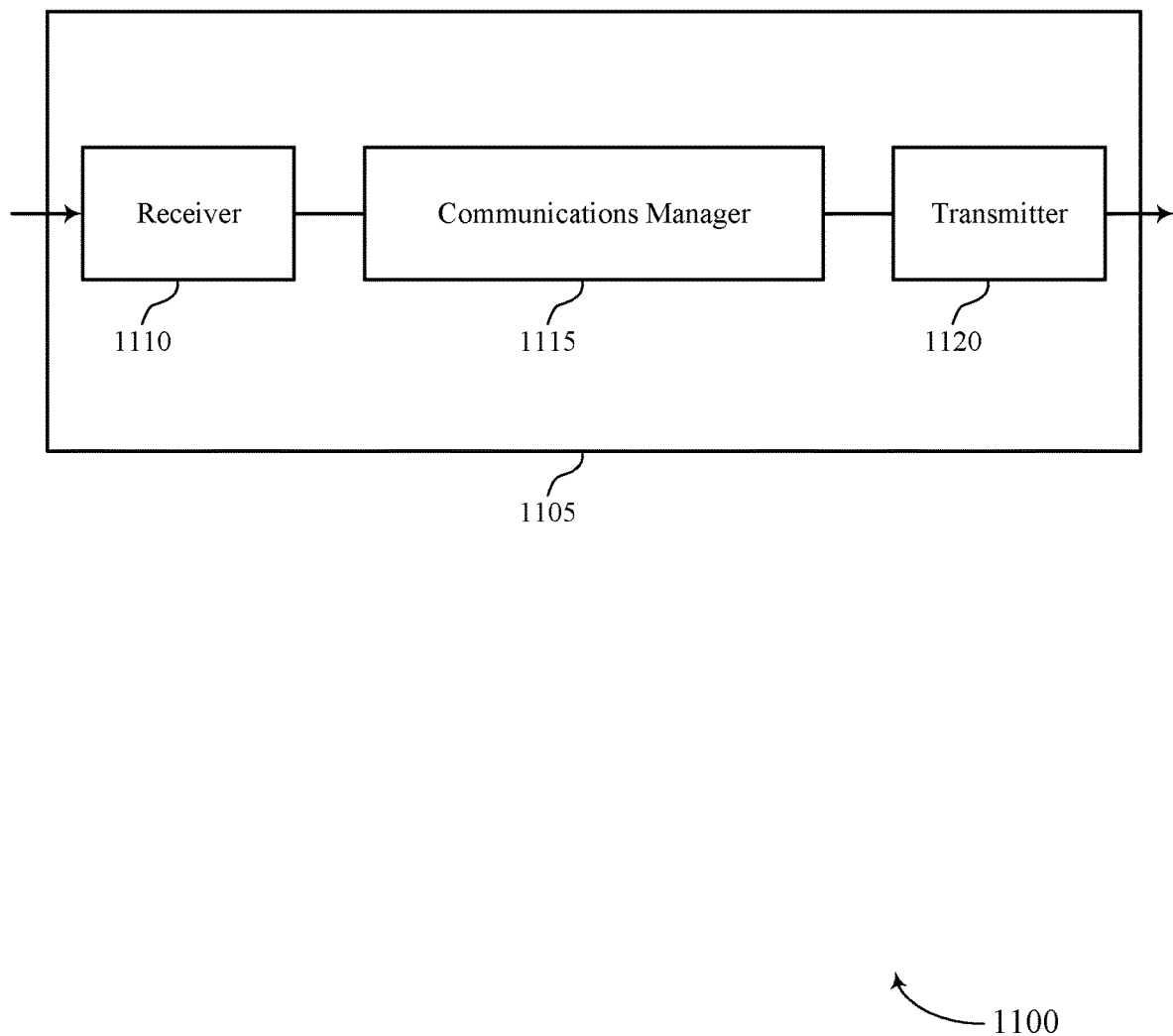
FIGS. 11 and 12 show block diagrams of devices that support beam-specific system information scheduling window design in accordance with aspects of the present disclosure.

FIG. 11 shows a block diagram 1100 of a device 1105 that supports beam-specific system information scheduling window design in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to beam-specific system information scheduling window design, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine, based on SS/PBCH blocks which are actually transmitted, corresponding physical downlink control channel monitoring occasions within a system information window, transmit, to a UE, an indication of which SS/PBCH blocks are actually transmitted, and transmit a physical downlink control channel within the system information window during the corresponding physical downlink control channel monitoring occasions. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
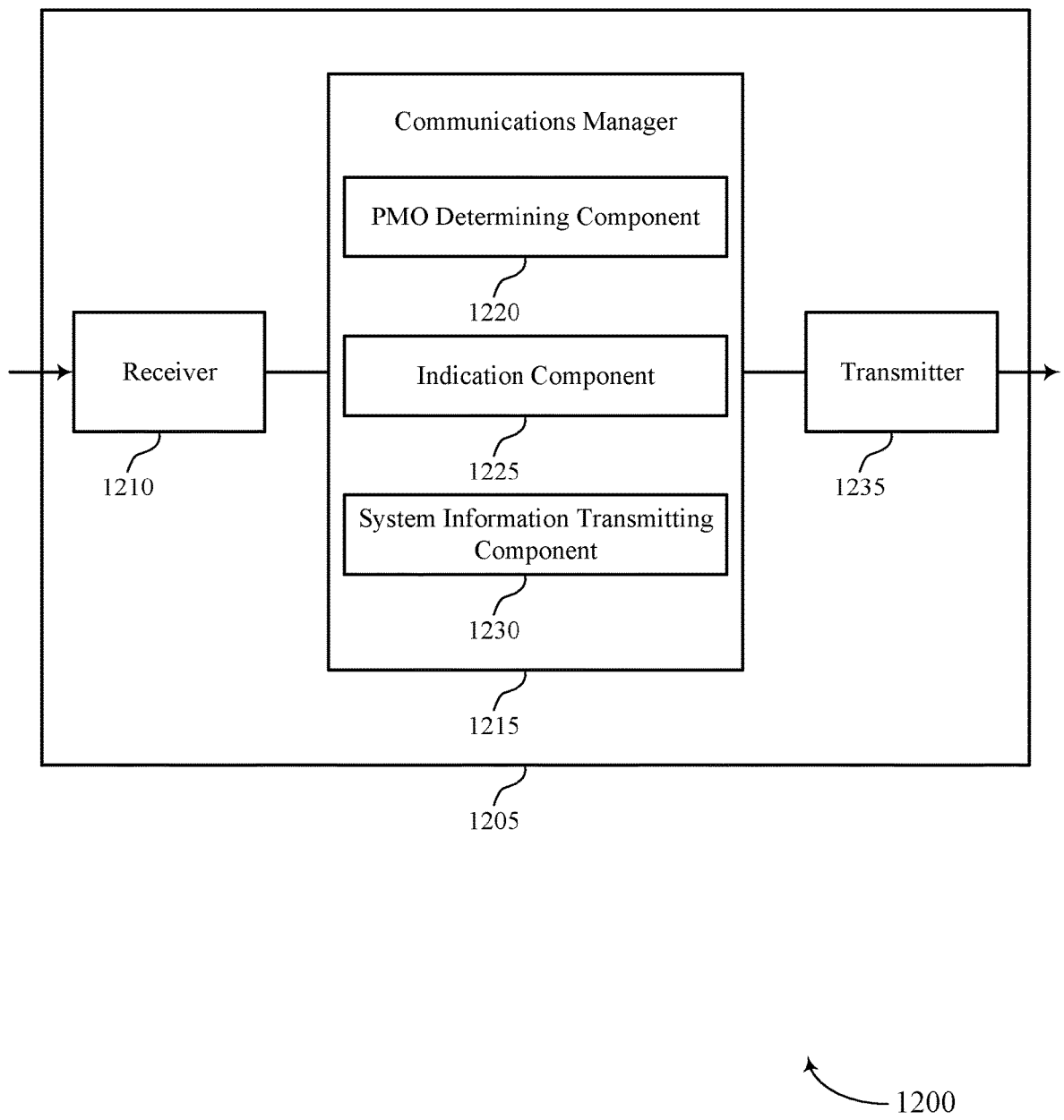

FIG. 12 shows a block diagram 1200 of a device 1205 that supports beam-specific system information scheduling window design in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to beam-specific system information scheduling window design, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a PMO determining component 1220, an indication component 1225, and a system information transmitting component 1230. The communications manager 1215 may be an example of aspects of the communications manager 1410 described herein.

The PMO determining component 1220 may determine, based on SS/PBCH blocks which are actually transmitted, corresponding physical downlink control channel monitoring occasions within a system information window. The indication component 1225 may transmit, to a UE, an indication of which SS/PBCH blocks are actually transmitted. The system information transmitting component 1230 may transmit a physical downlink control channel within the system information window during the corresponding physical downlink control channel monitoring occasions.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
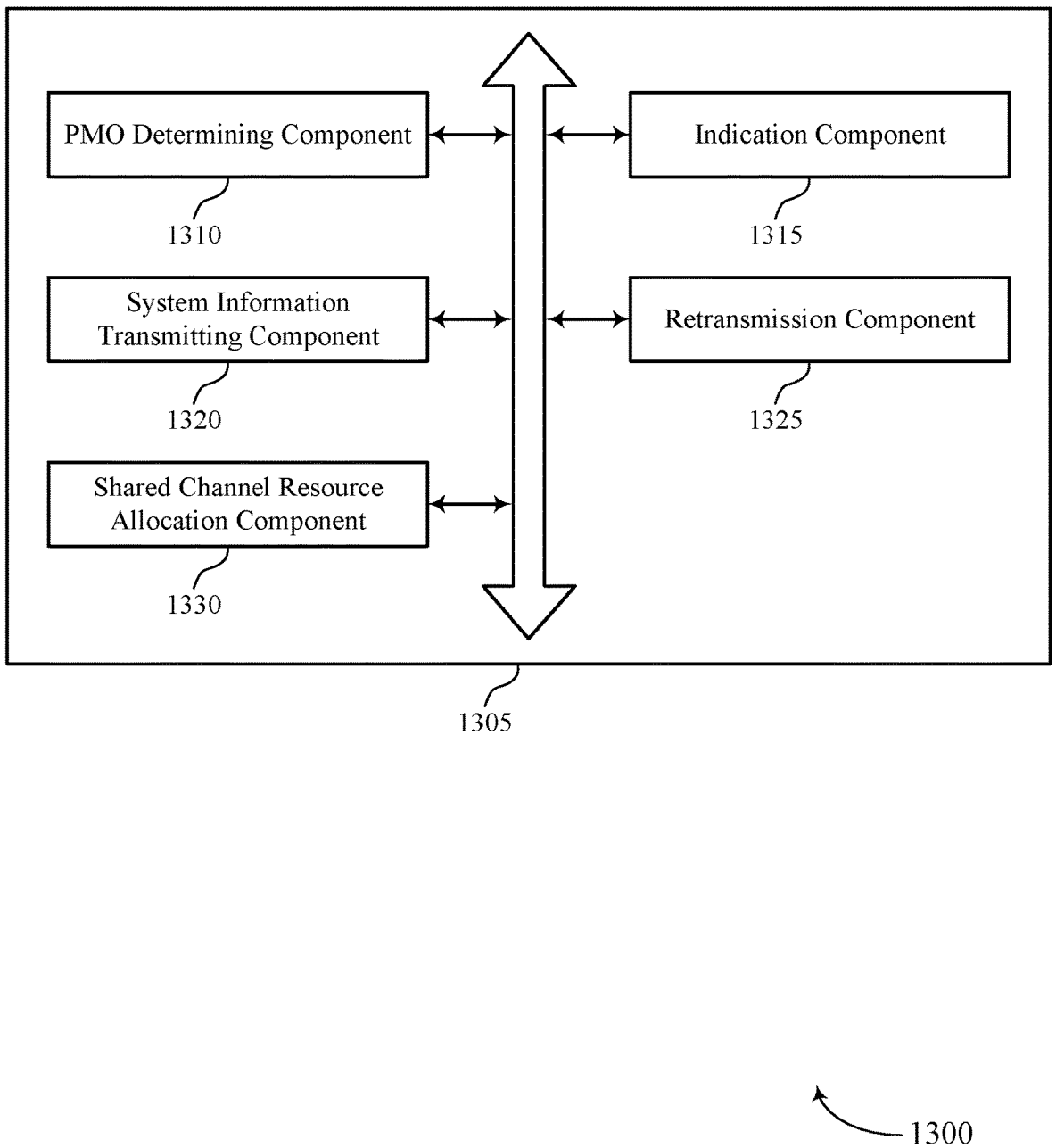
FIG. 13 shows a block diagram of a communications manager that supports beam-specific system information scheduling window design in accordance with aspects of the present disclosure.

FIG. 13 shows a block diagram 1300 of a communications manager 1305 that supports beam-specific system information scheduling window design in accordance with aspects of the present disclosure. The communications manager 1305 may be an example of aspects of a communications manager 1115, a communications manager 1215, or a communications manager 1410 described herein. The communications manager 1305 may include a PMO determining component 1310, an indication component 1315, a system information transmitting component 1320, a retransmission component 1325, and a shared channel resource allocation component 1330. Each of these modules may communicate, directly or indirectly, with one another (e.g., via one or more buses).

The PMO determining component 1310 may determine, based on SS/PBCH blocks which are actually transmitted, corresponding physical downlink control channel monitoring occasions within a system information window. In some examples, the PMO determining component 1310 may determine a starting time within the system information window for each of the corresponding physical downlink control channel monitoring occasions.

In some examples, the PMO determining component 1310 may determine the starting time for each of the corresponding physical downlink control channel monitoring occasions is based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof. In some cases, the starting time for each of the corresponding physical downlink control channel monitoring occasions is the same in different system information windows. In some cases, the starting time for each of the corresponding physical downlink control channel monitoring occasions is different in different system information windows.

The indication component 1315 may transmit, to a UE, an indication of which SS/PBCH blocks are actually transmitted. In some examples, the indication component 1315 may transmit an index of each actually transmitted SS/PBCH block, a duration for the physical downlink control channel monitoring occasions, a duration of the system information window, a number of actually transmitted SS/PBCH blocks, or any combination thereof, via a SIB1.

The system information transmitting component 1320 may transmit a physical downlink control channel within the system information window during the corresponding physical downlink control channel monitoring occasions.

The retransmission component 1325 may transmit retransmissions of the physical downlink control channel and system information messages based on a multiplexing of the physical downlink control channel monitoring occasions into a transmission, where the transmission is repeated within the system information window. The retransmission component 1325 may transmit retransmissions of the physical downlink control channel and system information messages within the system information window. In some examples, the retransmission component 1325 may transmit retransmissions of the physical downlink control channel that are continuous in time with an initial transmission of the physical downlink control channel. In some examples, the retransmission component 1325 may transmit retransmissions of the physical downlink control channel that are non-continuous in time with an initial transmission of the physical downlink control channel.

The shared channel resource allocation component 1330 may indicate, via the monitored physical downlink control channel, one or more physical downlink shared channel resource allocations for receipt of other system information. In some cases, the one or more physical downlink shared channel resource allocations are the same as corresponding resource allocations for physical downlink shared channel messages carrying remaining minimum system information associated with the SS/PBCH blocks which are actually transmitted to the UE having a control resource set multiplexing pattern 1. In some cases, the one or more physical downlink shared channel resource allocations are the same as corresponding resource allocations for physical downlink shared channel messages carrying remaining minimum system information associated with the SS/PBCH blocks which are actually transmitted to the UE based on a multiplexing pattern.

Figure 14:
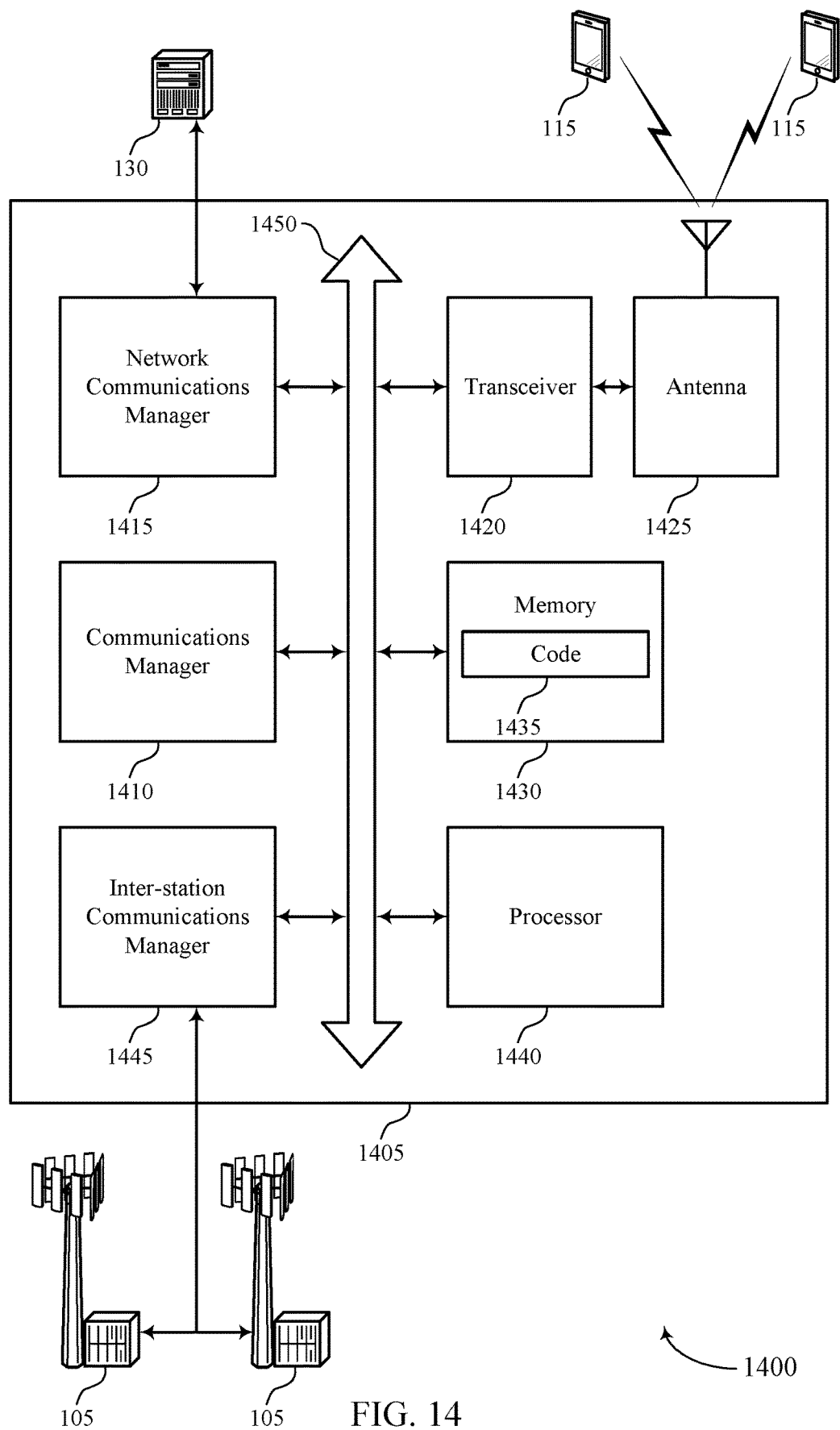
FIG. 14 shows a diagram of a system including a device that supports beam-specific system information scheduling window design in accordance with aspects of the present disclosure.

FIG. 14 shows a diagram of a system 1400 including a device 1405 that supports beam-specific system information scheduling window design in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine, based on SS/PBCH blocks which are actually transmitted, corresponding physical downlink control channel monitoring occasions within a system information window, transmit, to a UE, an indication of which SS/PBCH blocks are actually transmitted, and transmit a physical downlink control channel within the system information window during the corresponding physical downlink control channel monitoring occasions.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting beam-specific system information scheduling window design).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
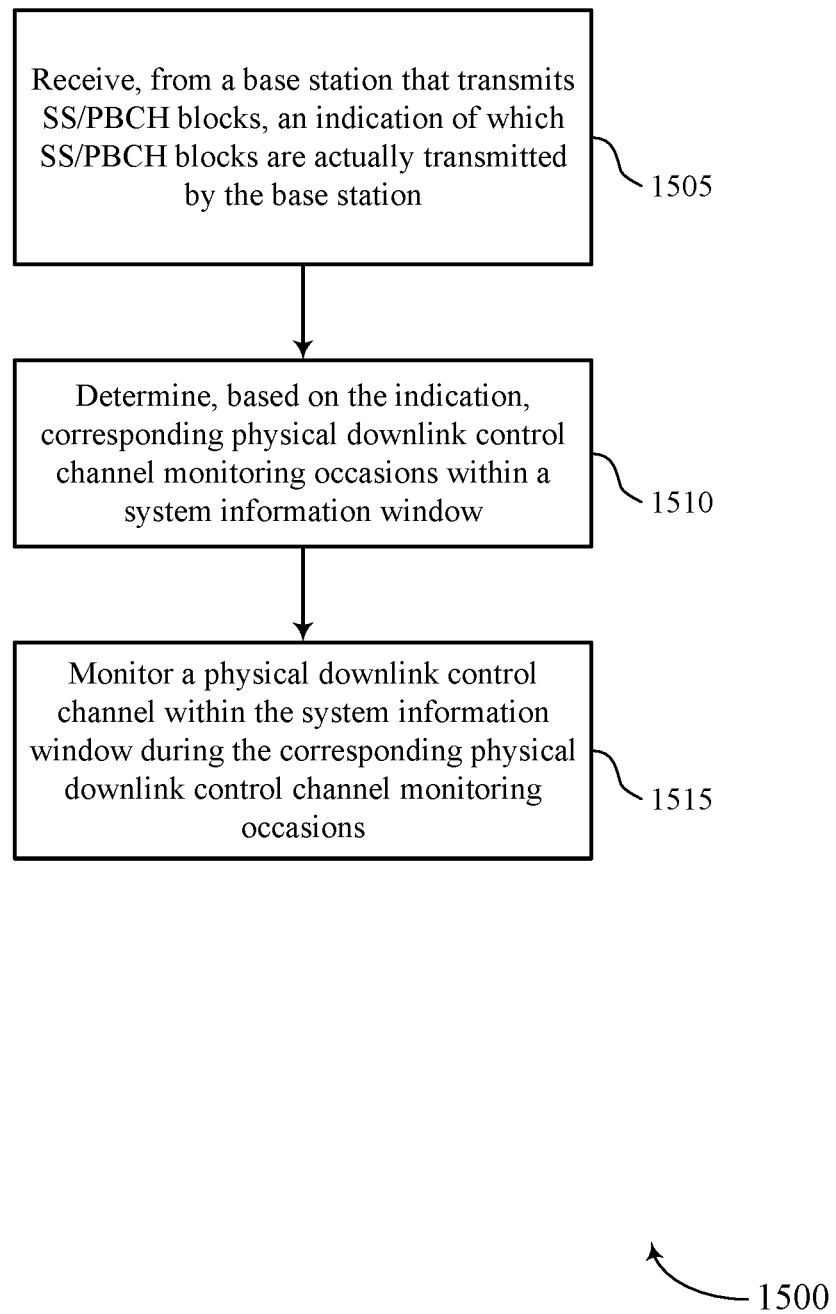
FIGS. 15 through 20 show flowcharts illustrating methods that support beam-specific system information scheduling window design in accordance with aspects of the present disclosure.

FIG. 15 shows a flowchart illustrating a method 1500 that supports beam-specific system information scheduling window design in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station that transmits SS/PBCH blocks an indication of which SS/PBCH blocks are actually transmitted by the base station. The operations of 1505 may be performed according to the methods described herein. In some examples, aspects of the operations of 1505 may be performed by an indication component as described with reference to FIGS. 7 through 10.

At 1510, the UE may determine, based on the indication, corresponding physical downlink control channel monitoring occasions within a system information window. The operations of 1510 may be performed according to the methods described herein. In some examples, aspects of the operations of 1510 may be performed by a PMO determining component as described with reference to FIGS. 7 through 10.

At 1515, the UE may monitor a physical downlink control channel within the system information window during the corresponding physical downlink control channel monitoring occasions. The operations of 1515 may be performed according to the methods described herein. In some examples, aspects of the operations of 1515 may be performed by a monitoring component as described with reference to FIGS. 7 through 10.

Figure 16:
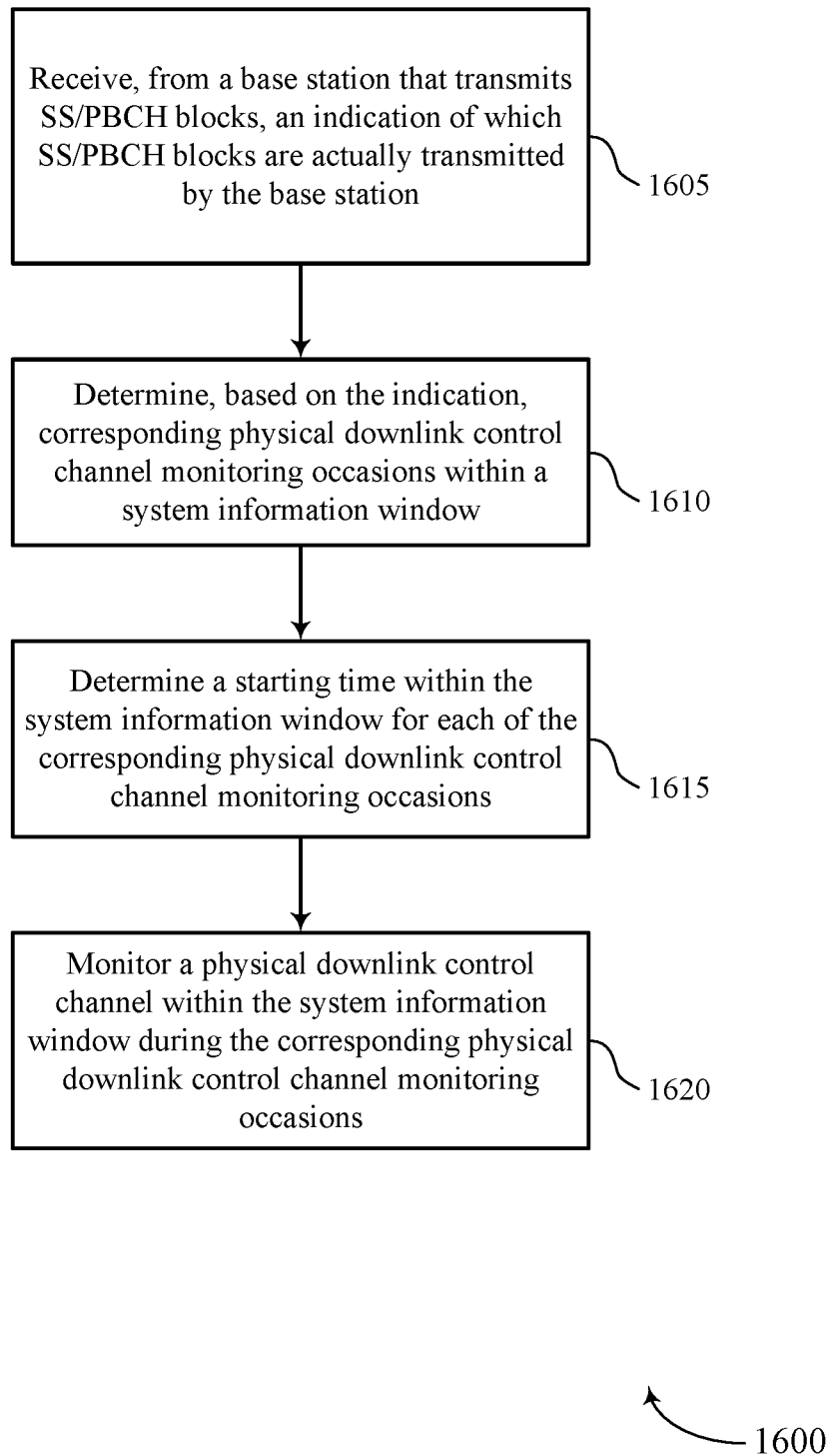

FIG. 16 shows a flowchart illustrating a method 1600 that supports beam-specific system information scheduling window design in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station that transmits SS/PBCH blocks, an indication of which SS/PBCH blocks are actually transmitted by the base station. The operations of 1605 may be performed according to the methods described herein. In some examples, aspects of the operations of 1605 may be performed by an indication component as described with reference to FIGS. 7 through 10.

At 1610, the UE may determine, based on the indication, corresponding physical downlink control channel monitoring occasions within a system information window. The operations of 1610 may be performed according to the methods described herein. In some examples, aspects of the operations of 1610 may be performed by a PMO determining component as described with reference to FIGS. 7 through 10.

At 1615, the UE may determine a starting time within the system information window for each of the corresponding physical downlink control channel monitoring occasions. The operations of 1615 may be performed according to the methods described herein. In some examples, aspects of the operations of 1615 may be performed by a PMO determining component as described with reference to FIGS. 7 through 10.

At 1620, the UE may monitor a physical downlink control channel within the system information window during the corresponding physical downlink control channel monitoring occasions. The operations of 1620 may be performed according to the methods described herein. In some examples, aspects of the operations of 1620 may be performed by a monitoring component as described with reference to FIGS. 7 through 10.

Figure 17:
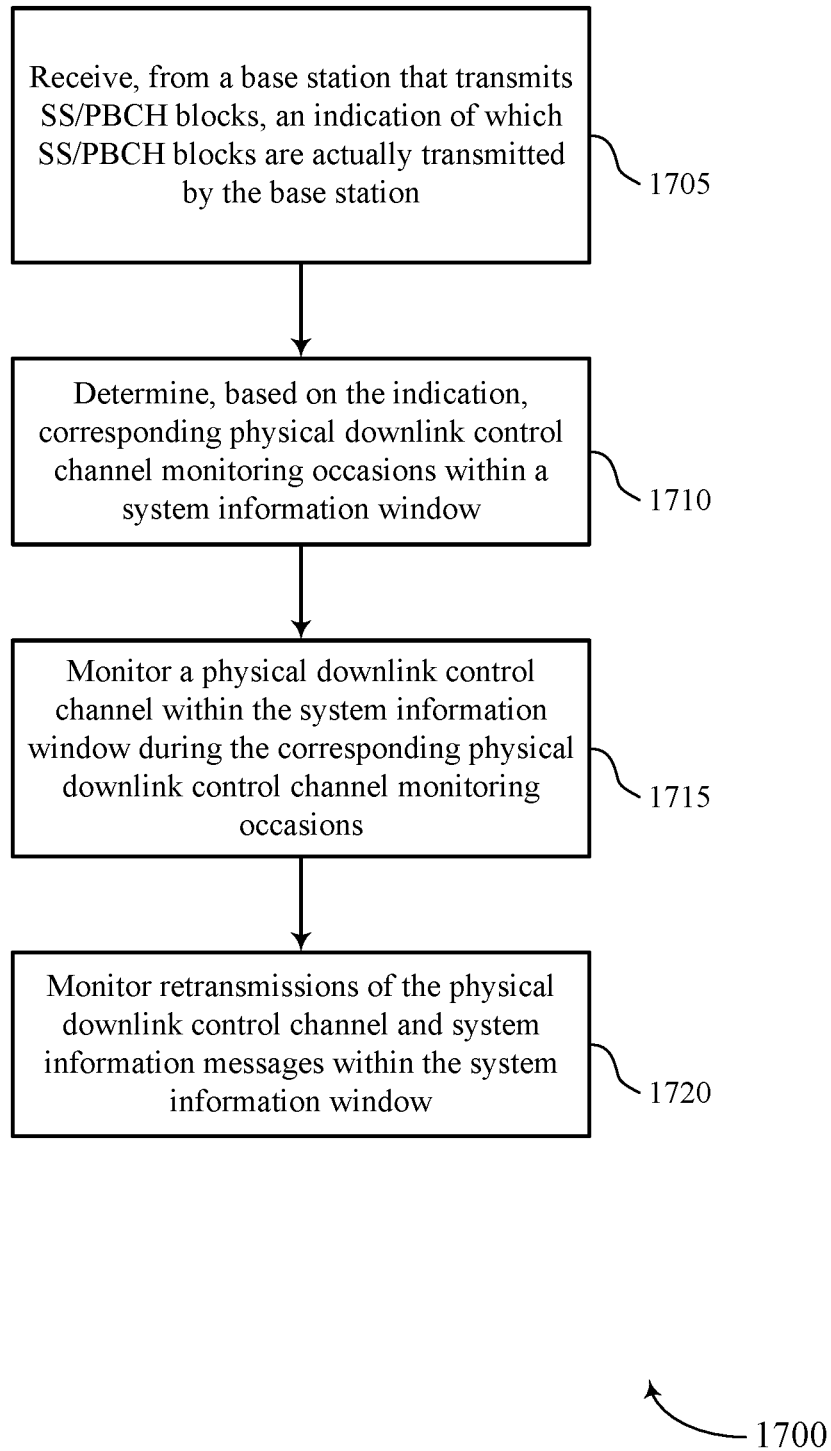

FIG. 17 shows a flowchart illustrating a method 1700 that supports beam-specific system information scheduling window design in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station that transmits SS/PBCH blocks, an indication of which SS/PBCH blocks are actually transmitted by the base station. The operations of 1705 may be performed according to the methods described herein. In some examples, aspects of the operations of 1705 may be performed by an indication component as described with reference to FIGS. 7 through 10.

At 1710, the UE may determine, based on the indication, corresponding physical downlink control channel monitoring occasions within a system information window. The operations of 1710 may be performed according to the methods described herein. In some examples, aspects of the operations of 1710 may be performed by a PMO determining component as described with reference to FIGS. 7 through 10.

At 1715, the UE may monitor a physical downlink control channel within the system information window during the corresponding physical downlink control channel monitoring occasions. The operations of 1715 may be performed according to the methods described herein. In some examples, aspects of the operations of 1715 may be performed by a monitoring component as described with reference to FIGS. 7 through 10.

At 1720, the UE may monitor retransmissions, or repeated transmissions, of the physical downlink control channel and system information messages within the system information window. The operations of 1720 may be performed according to the methods described herein. In some examples, aspects of the operations of 1720 may be performed by a retransmission monitoring component as described with reference to FIGS. 7 through 10.

Figure 18:
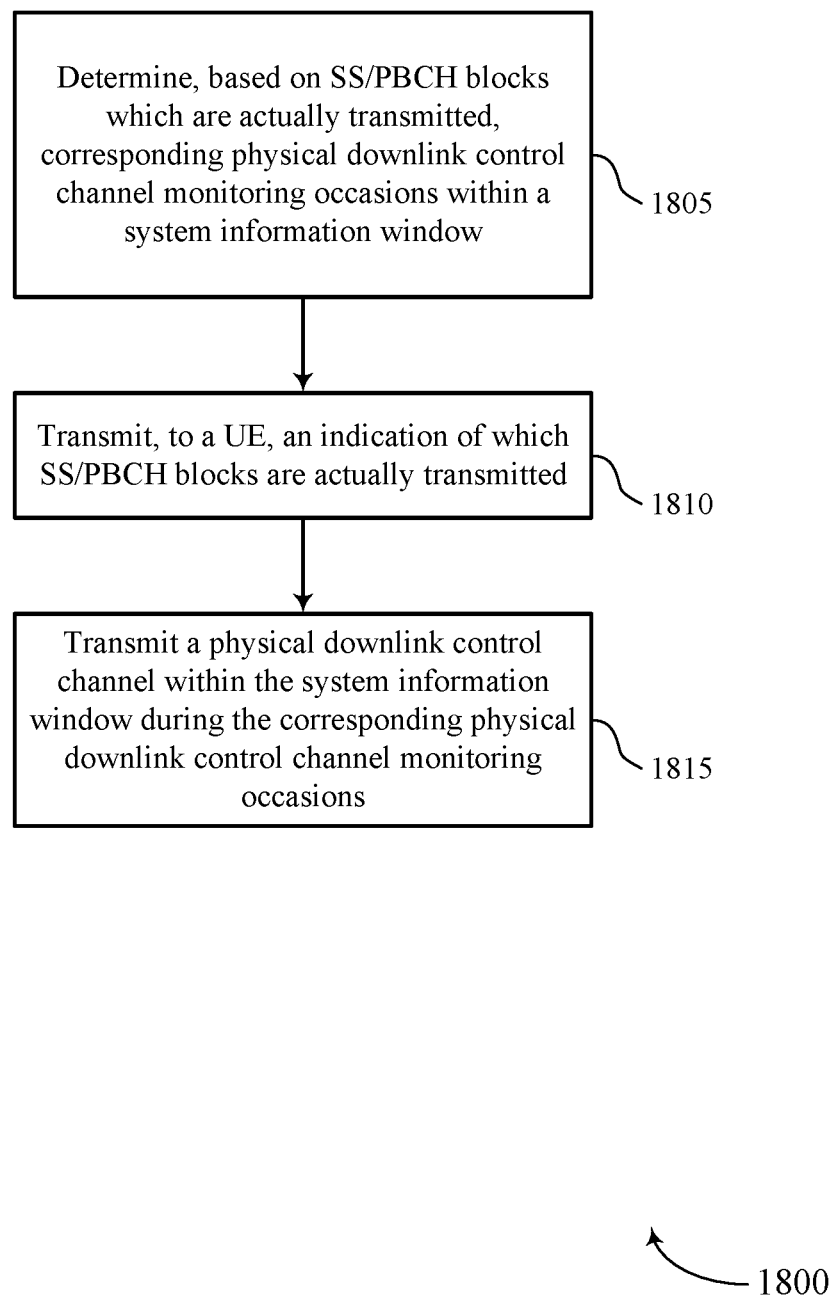

FIG. 18 shows a flowchart illustrating a method 1800 that supports beam-specific system information scheduling window design in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may determine, based on SS/PBCH blocks which are actually transmitted, corresponding physical downlink control channel monitoring occasions within a system information window. The operations of 1805 may be performed according to the methods described herein. In some examples, aspects of the operations of 1805 may be performed by a PMO determining component as described with reference to FIGS. 11 through 14.

At 1810, the base station may transmit, to a UE, an indication of which SS/PBCH blocks are actually transmitted. The operations of 1810 may be performed according to the methods described herein. In some examples, aspects of the operations of 1810 may be performed by an indication component as described with reference to FIGS. 11 through 14.

At 1815, the base station may transmit a physical downlink control channel within the system information window during the corresponding physical downlink control channel monitoring occasions. The operations of 1815 may be performed according to the methods described herein. In some examples, aspects of the operations of 1815 may be performed by a system information transmitting component as described with reference to FIGS. 11 through 14.

Figure 19:
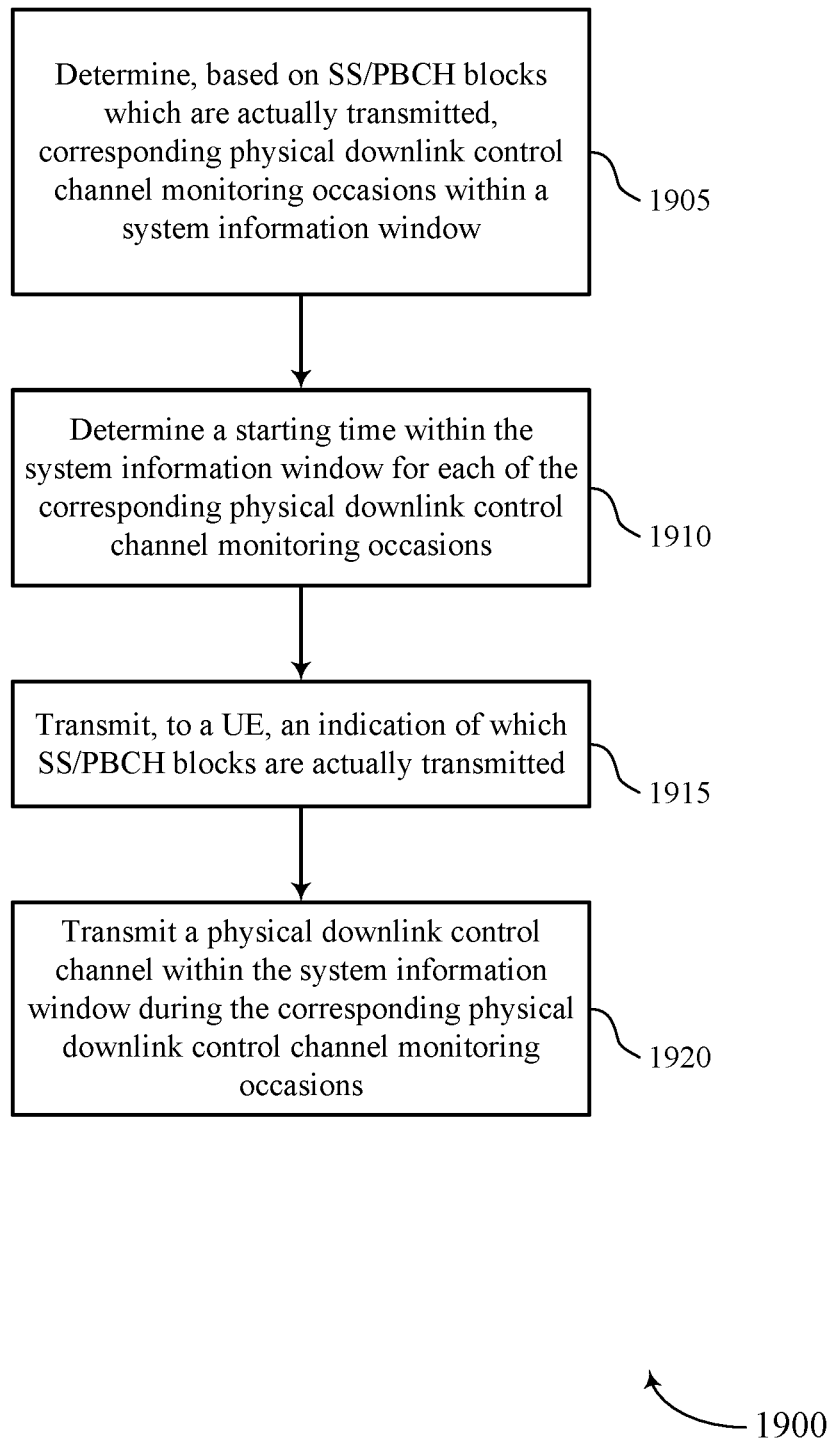

FIG. 19 shows a flowchart illustrating a method 1900 that supports beam-specific system information scheduling window design in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may determine, based on SS/PBCH blocks which are actually transmitted, corresponding physical downlink control channel monitoring occasions within a system information window. The operations of 1905 may be performed according to the methods described herein. In some examples, aspects of the operations of 1905 may be performed by a PMO determining component as described with reference to FIGS. 11 through 14.

At 1910, the base station may determine a starting time within the system information window for each of the corresponding physical downlink control channel monitoring occasions. The operations of 1910 may be performed according to the methods described herein. In some examples, aspects of the operations of 1910 may be performed by a PMO determining component as described with reference to FIGS. 11 through 14.

At 1915, the base station may transmit, to a UE, an indication of which SS/PBCH blocks are actually transmitted. The operations of 1915 may be performed according to the methods described herein. In some examples, aspects of the operations of 1915 may be performed by an indication component as described with reference to FIGS. 11 through 14.

At 1920, the base station may transmit a physical downlink control channel within the system information window during the corresponding physical downlink control channel monitoring occasions. The operations of 1920 may be performed according to the methods described herein. In some examples, aspects of the operations of 1920 may be performed by a system information transmitting component as described with reference to FIGS. 11 through 14.

Figure 20:
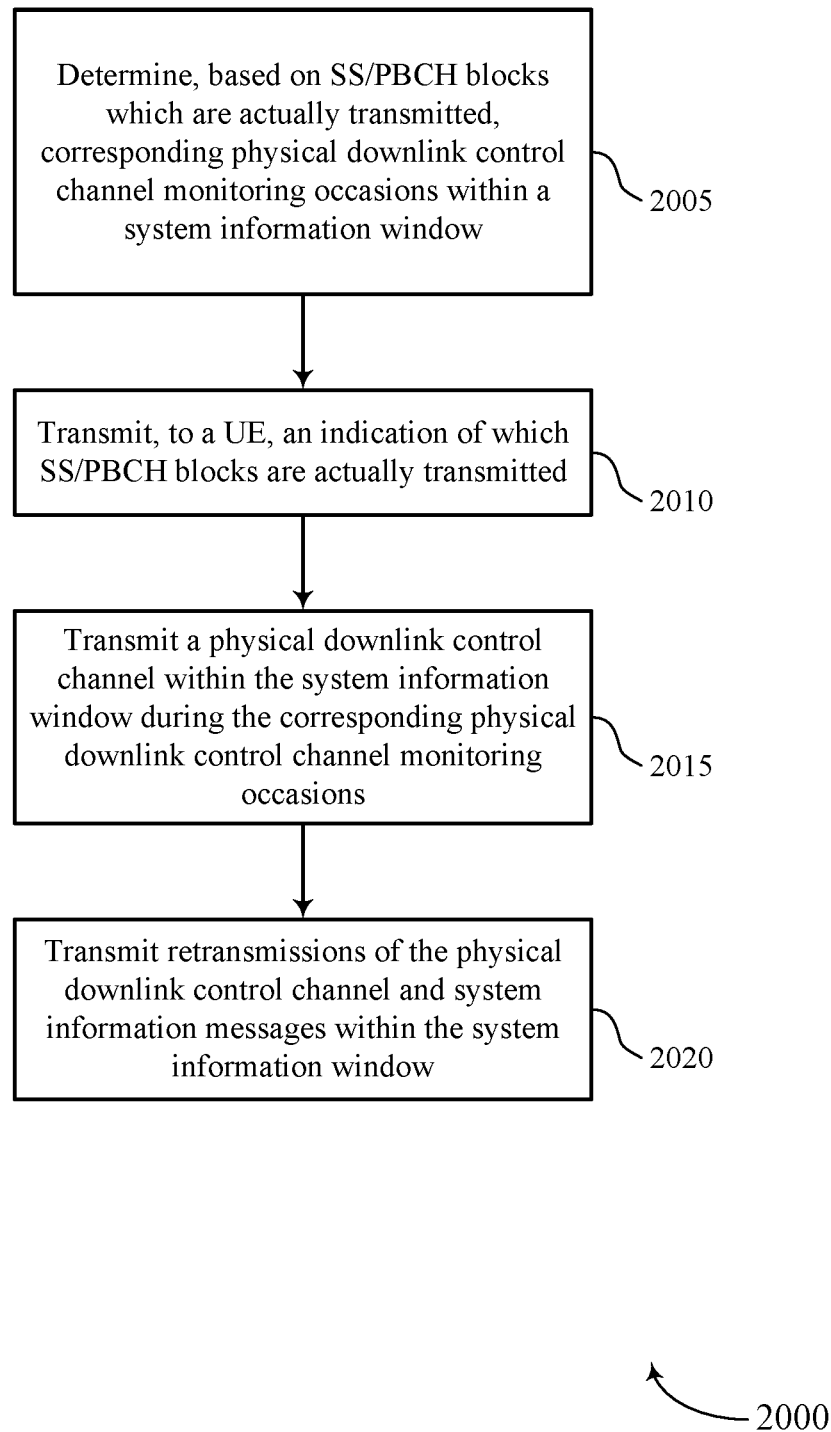

FIG. 20 shows a flowchart illustrating a method 2000 that supports beam-specific system information scheduling window design in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may determine, based on SS/PBCH blocks which are actually transmitted, corresponding physical downlink control channel monitoring occasions within a system information window. The operations of 2005 may be performed according to the methods described herein. In some examples, aspects of the operations of 2005 may be performed by a PMO determining component as described with reference to FIGS. 11 through 14.

At 2010, the base station may transmit, to a UE, an indication of which SS/PBCH blocks are actually transmitted. The operations of 2010 may be performed according to the methods described herein. In some examples, aspects of the operations of 2010 may be performed by an indication component as described with reference to FIGS. 11 through 14.

At 2015, the base station may transmit a physical downlink control channel within the system information window during the corresponding physical downlink control channel monitoring occasions. The operations of 2015 may be performed according to the methods described herein. In some examples, aspects of the operations of 2015 may be performed by a system information transmitting component as described with reference to FIGS. 11 through 14.

At 2020, the base station may transmit retransmissions of the physical downlink control channel and system information messages within the system information window. The operations of 2020 may be performed according to the methods described herein. In some examples, aspects of the operations of 2020 may be performed by a retransmission component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project"

(3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Embodiment 1

A method of wireless communication is described. The method may include receiving, from a base station that transmits synchronization signal/physical broadcast channel (SS/PBCH) blocks, an indication of which SS/PBCH blocks are actually transmitted by the base station, determining, based on the indication, corresponding physical downlink control channel monitoring occasions within a system information window, and monitoring a physical downlink control channel within the system information window during the corresponding physical downlink control channel monitoring occasions.

Embodiment 2

The method of embodiment 1, further comprising: monitoring retransmissions of the physical downlink control channel and system information messages based on a multiplexing of the physical downlink control channel monitoring occasions into a transmission, where the transmission may be repeated within the system information window.

Embodiment 3

The method of any of embodiments 1 or 2, further comprising: monitoring retransmissions of the physical downlink control channel and system information messages within the system information window.

Embodiment 4

The method of any of embodiments 1 to 3, wherein monitoring retransmissions of the physical downlink control channel and system information messages comprises monitoring retransmissions of the physical downlink control channel that may be non-continuous in time with an initial transmission of the physical downlink control channel.

Embodiment 5

The method of any of embodiments 1 to 3, wherein monitoring retransmissions of the physical downlink control channel and system information messages comprises monitoring retransmissions of the physical downlink control channel that may be continuous in time with an initial transmission of the physical downlink control channel.

Embodiment 6

The method of any of embodiments 1 to 5, wherein receiving the indication of which SS/PBCH blocks may be actually transmitted by the base station comprises receiving an index of each actually transmitted SS/PBCH block, a duration for the physical downlink control channel monitoring occasions, a duration of the system information window, a number of actually transmitted SS/PBCH blocks, or any combination thereof, via a system information block 1 (SIB1).

Embodiment 7

The method of any of embodiments 1 to 6, further comprising: determining a starting time within the system information window for each of the corresponding physical downlink control channel monitoring occasions.

Embodiment 8

The method of any of embodiments 1 to 7, further comprising: determining the starting time for each of the corresponding physical downlink control channel monitoring occasions may be based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof.

Embodiment 9

The method of any of embodiments 1 to 8, wherein the starting time for each of the corresponding physical downlink control channel monitoring occasions may be the same in different system information windows.

Embodiment 10

The method of any of embodiments 1 to 8, wherein the starting time for each of the corresponding physical downlink control channel monitoring occasions may be different in different system information windows.

Embodiment 11

The method of any of embodiments 1 to 10, further comprising: identifying, via the monitored physical downlink control channel, one or more physical downlink shared channel resource allocations for receipt of other system information.

Embodiment 12

The method of any of embodiments 1 to 11, wherein the one or more physical downlink shared channel resource allocations may be the same as corresponding resource allocations for physical downlink shared channel messages carrying remaining minimum system information associated with the SS/PBCH blocks which may be actually transmitted by the base station having a control resource set multiplexing pattern 1.

Embodiment 13

The method of any of embodiments 1 to 12, wherein the one or more physical downlink shared channel resource allocations may be the same as corresponding resource allocations for physical downlink shared channel messages carrying remaining minimum system information associated with the SS/PBCH blocks which may be actually transmitted by the base station based on a multiplexing pattern.

Embodiment 14

An apparatus for wireless communication comprising a processor, memory coupled with the processor, and instructions stored in the memory and executable by the processor to cause the apparatus to perform a method of any of embodiments 1 to 13.

Embodiment 15

An apparatus comprising at least one means for performing a method of any of embodiments 1 to 13.

Embodiment 16

A non-transitory computer-readable medium storing code for wireless communications, the code comprising instructions executable by a processor to perform a method of any of embodiments 1 to 13.

Embodiment 17

A method of wireless communications is described. The method may include determining, based on synchronization signal/physical broadcast channel (SS/PBCH) blocks which are actually transmitted, corresponding physical downlink control channel monitoring occasions within a system information window, transmitting, to a UE, an indication of which SS/PBCH blocks are actually transmitted, and transmitting a physical downlink control channel within the system information window during the corresponding physical downlink control channel monitoring occasions.

Embodiment 18

The method of embodiment 17, further comprising: transmitting retransmissions of the physical downlink control channel and system information messages based on a multiplexing of the physical downlink control channel monitoring occasions into a transmission, where the transmission may be repeated within the system information window.

Embodiment 19

The method of any of embodiments 17 or 18, further comprising: transmitting retransmissions of the physical downlink control channel and system information messages within the system information window.

Embodiment 20

The method of any of embodiments 17 to 19, wherein transmitting retransmissions of the physical downlink control channel and system information messages comprises transmitting retransmissions of the physical downlink control channel that may be non-continuous in time with an initial transmission of the physical downlink control channel.

Embodiment 21

The method of any of embodiments 17 to 19, wherein transmitting retransmissions of the physical downlink control channel and system information messages comprises transmitting retransmissions of the physical downlink control channel that may be continuous in time with an initial transmission of the physical downlink control channel.

Embodiment 22

The method of any of embodiments 17 to 21, wherein transmitting the indication of which SS/PBCH blocks may be actually transmitted comprises transmitting an index of each actually transmitted SS/PBCH block, a duration for the physical downlink control channel monitoring occasions, a duration of the system information window, a number of actually transmitted SS/PBCH blocks, or any combination thereof, via a system information block (SIB1).

Embodiment 23

The method of any of embodiments 17 to 22, further comprising: determining a starting time within the system information window for each of the corresponding physical downlink control channel monitoring occasions.

Embodiment 24

The method of any of embodiments 17 to 23, further comprising: determining the starting time for each of the corresponding physical downlink control channel monitoring occasions may be based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof.

Embodiment 25

The method of any of embodiments 17 to 24, wherein the starting time for each of the corresponding physical downlink control channel monitoring occasions may be the same in different system information windows.

Embodiment 26

The method of any of embodiments 17 to 24, wherein the starting time for each of the corresponding physical downlink control channel monitoring occasions may be different in different system information windows.

Embodiment 27

The method of any of embodiments 17 to 26, further comprising: indicating, via the monitored physical downlink control channel, one or more physical downlink shared channel resource allocations for receipt of other system information.

Embodiment 28

The method of any of embodiments 17 to 27, wherein the one or more physical downlink shared channel resource allocations may be the same as corresponding resource allocations for physical downlink shared channel messages carrying remaining minimum system information associated with the SS/PBCH blocks which may be actually transmitted to the UE having a control resource set multiplexing pattern 1.

Embodiment 29

The method of any of embodiments 17 to 28, wherein the one or more physical downlink shared channel resource allocations may be the same as corresponding resource allocations for physical downlink shared channel messages carrying remaining minimum system information associated with the SS/PBCH blocks which may be actually transmitted to the UE based on a multiplexing pattern.

Embodiment 30

An apparatus for wireless communication comprising a processor, memory coupled with the processor, and instructions stored in the memory and executable by the processor to cause the apparatus to perform a method of any of any of embodiments 17 to 29.

Embodiment 31

An apparatus comprising at least one means for performing a method of any of embodiments 17 to 29.

Embodiment 32

A non-transitory computer-readable medium storing code for wireless communications, the code comprising instructions executable by a processor to perform a method of any of embodiments 17 to 29.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving, from a base station that transmits synchronization signal/physical broadcast channel (SS/PBCH) blocks, an indication of which SS/PBCH blocks in a set of SS/PBCH blocks are actually transmitted by the base station;
    determining, based at least in part on the indication, corresponding physical downlink control channel (PDCCH) monitoring occasions within a system information window, wherein the PDCCH monitoring occasions within the system information window are determined based at least in part on actually transmitted SS/PBCH blocks in the set of SS/PBCH blocks and without regard to SS/PBCH blocks in the set of SS/PBCH blocks that are not transmitted by the base station; and
    monitoring a physical downlink control channel within the system information window during the corresponding physical downlink control channel monitoring occasions.

2. The method of claim 1, further comprising:
    monitoring retransmissions of the physical downlink control channel and system information messages based on a multiplexing of the physical downlink control channel monitoring occasions into a transmission, wherein the transmission is repeated within the system information window.

3. The method of claim 1, further comprising:
    monitoring retransmissions of the physical downlink control channel and system information messages within the system information window.

4. The method of claim 3, wherein monitoring retransmissions of the physical downlink control channel and system information messages comprises:
    monitoring retransmissions of the physical downlink control channel that are non-continuous in time with an initial transmission of the physical downlink control channel.

5. The method of claim 3, wherein monitoring retransmissions of the physical downlink control channel and system information messages comprises:
    monitoring retransmissions of the physical downlink control channel that are continuous in time with an initial transmission of the physical downlink control channel.

6. The method of claim 1, wherein receiving the indication of which SS/PBCH blocks are actually transmitted by the base station comprises:
    receiving an index of each actually transmitted SS/PBCH block, a duration for the physical downlink control channel monitoring occasions, a duration of the system information window, a number of actually transmitted SS/PBCH blocks, or any combination thereof, via a system information block 1 (SIB1).

7. The method of claim 1, further comprising:
    determining a starting time within the system information window for each of the corresponding physical downlink control channel monitoring occasions.

8. The method of claim 7, wherein:
    determining the starting time for each of the corresponding physical downlink control channel monitoring occasions is based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof.

9. The method of claim 7, wherein the starting time for each of the corresponding physical downlink control channel monitoring occasions is the same in different system information windows.

10. The method of claim 7, wherein the starting time for each of the corresponding physical downlink control channel monitoring occasions is different in different system information windows.

11. The method of claim 1, further comprising:
    identifying, via the monitored physical downlink control channel, one or more physical downlink shared channel resource allocations for receipt of other system information.

12. The method of claim 11, wherein the one or more physical downlink shared channel resource allocations are the same as corresponding resource allocations for physical downlink shared channel messages carrying remaining minimum system information associated with the SS/PBCH blocks which are actually transmitted by the base station having a control resource set multiplexing pattern 1.

13. The method of claim 11, wherein the one or more physical downlink shared channel resource allocations are the same as corresponding resource allocations for physical downlink shared channel messages carrying remaining minimum system information associated with the SS/PBCH blocks which are actually transmitted by the base station based at least in part on a multiplexing pattern.

14. A method for wireless communications by a base station, comprising:
- determining, based on synchronization signal/physical broadcast channel (SS/PBCH) blocks which are actually transmitted in a set of SS/PBCH blocks, corresponding physical downlink control channel (PDCCH) monitoring occasions within a system information window, wherein the PDCCH monitoring occasions within the system information window are determined based at least in part on actually transmitted SS/PBCH blocks in the set of SS/PBCH blocks and without regard for SS/PBCH blocks in the set of SS/PBCH blocks that are not transmitted by the base station;
- transmitting, to a user equipment (UE), an indication of which SS/PBCH blocks are actually transmitted; and
- transmitting a physical downlink control channel within the system information window during the corresponding physical downlink control channel monitoring occasions.

15. The method of claim 14, further comprising:
- transmitting retransmissions of the physical downlink control channel and system information messages based on a multiplexing of the physical downlink control channel monitoring occasions into a transmission, wherein the transmission is repeated within the system information window.

16. The method of claim 14, further comprising:
- transmitting retransmissions of the physical downlink control channel and system information messages within the system information window.

17. The method of claim 16, wherein transmitting retransmissions of the physical downlink control channel and system information messages comprises:
- transmitting retransmissions of the physical downlink control channel that are non-continuous in time with an initial transmission of the physical downlink control channel.

18. The method of claim 16, wherein transmitting retransmissions of the physical downlink control channel and system information messages comprises:
- transmitting retransmissions of the physical downlink control channel that are continuous in time with an initial transmission of the physical downlink control channel.

19. The method of claim 14, wherein transmitting the indication of which SS/PBCH blocks are actually transmitted comprises:
- transmitting an index of each actually transmitted SS/PBCH block, a duration for the physical downlink control channel monitoring occasions, a duration of the system information window, a number of actually transmitted SS/PBCH blocks, or any combination thereof, via a system information block (SIB1).

20. The method of claim 14, further comprising:
- determining a starting time within the system information window for each of the corresponding physical downlink control channel monitoring occasions.

21. The method of claim 20, wherein:
- determining the starting time for each of the corresponding physical downlink control channel monitoring occasions is based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof.

22. The method of claim 20, wherein the starting time for each of the corresponding physical downlink control channel monitoring occasions is the same in different system information windows.

23. The method of claim 20, wherein the starting time for each of the corresponding physical downlink control channel monitoring occasions is different in different system information windows.

24. The method of claim 14, further comprising:
- indicating, via the monitored physical downlink control channel, one or more physical downlink shared channel resource allocations for receipt of other system information.

25. The method of claim 24, wherein the one or more physical downlink shared channel resource allocations are the same as corresponding resource allocations for physical downlink shared channel messages carrying remaining minimum system information associated with the SS/PBCH blocks which are actually transmitted to the UE having a control resource set multiplexing pattern 1.

26. The method of claim 24, wherein the one or more physical downlink shared channel resource allocations are the same as corresponding resource allocations for physical downlink shared channel messages carrying remaining minimum system information associated with the SS/PBCH blocks which are actually transmitted to the UE based at least in part on a multiplexing pattern.

27. An apparatus for wireless communication, comprising:
- a processor,
- memory coupled with the processor; and
- instructions stored in the memory and executable by the processor to cause the apparatus to:
  - receive, from a base station that transmits synchronization signal/physical broadcast channel (SS/PBCH) blocks, an indication of which SS/PBCH blocks in a set of SS/PBCH blocks are actually transmitted by the base station;
  - determine, based at least in part on the indication, corresponding physical downlink control channel (PDCCH) monitoring occasions within a system information window, wherein the PDCCH monitoring occasions within the system information window are determined based at least in part on the actually transmitted SS/PBCH blocks in the set of SS/PBCH blocks and without regard to SS/PBCH blocks in the set of SS/PBCH blocks that are not transmitted by the base station; and
  - monitor a physical downlink control channel within the system information window during the corresponding physical downlink control channel monitoring occasions.

28. The apparatus of claim 27, wherein the instructions are further executable by the processor to cause the apparatus to:
- monitor retransmissions of the physical downlink control channel and system information messages based on a multiplexing of the physical downlink control channel monitoring occasions into a transmission, wherein the transmission is repeated within the system information window.

29. The apparatus of claim 27, wherein the instructions are further executable by the processor to cause the apparatus to:
- monitor retransmissions of the physical downlink control channel and system information messages within the system information window.

30. The apparatus of claim 29, wherein the instructions to monitor retransmissions of the physical downlink control channel and system information messages are executable by the processor to cause the apparatus to:

monitor retransmissions of the physical downlink control channel that are non-continuous in time with an initial transmission of the physical downlink control channel.

31. The apparatus of claim 29, wherein the instructions to monitor retransmissions of the physical downlink control channel and system information messages are executable by the processor to cause the apparatus to:

monitor retransmissions of the physical downlink control channel that are continuous in time with an initial transmission of the physical downlink control channel.

32. The apparatus of claim 27, wherein the instructions to receive the indication of which SS/PBCH blocks are actually transmitted by the base station are executable by the processor to cause the apparatus to:

receive an index of each actually transmitted SS/PBCH block, a duration for the physical downlink control channel monitoring occasions, a duration of the system information window, a number of actually transmitted SS/PBCH blocks, or any combination thereof, via a system information block 1 (SIB1).

33. The apparatus of claim 27, wherein the instructions are further executable by the processor to cause the apparatus to:

determine a starting time within the system information window for each of the corresponding physical downlink control channel monitoring occasions.

34. The apparatus of claim 33, wherein determining the starting time for each of the corresponding physical downlink control channel monitoring occasions is based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof.

35. The apparatus of claim 33, wherein the starting time for each of the corresponding physical downlink control channel monitoring occasions is the same in different system information windows.

36. The apparatus of claim 33, wherein the starting time for each of the corresponding physical downlink control channel monitoring occasions is different in different system information windows.

37. The apparatus of claim 27, wherein the instructions are further executable by the processor to cause the apparatus to:

identify, via the monitored physical downlink control channel, one or more physical downlink shared channel resource allocations for receipt of other system information.

38. The apparatus of claim 37, wherein the one or more physical downlink shared channel resource allocations are the same as corresponding resource allocations for physical downlink shared channel messages carrying remaining minimum system information associated with the SS/PBCH blocks which are actually transmitted by the base station having a control resource set multiplexing pattern 1.

39. The apparatus of claim 37, wherein the one or more physical downlink shared channel resource allocations are the same as corresponding resource allocations for physical downlink shared channel messages carrying remaining minimum system information associated with the SS/PBCH blocks which are actually transmitted by the base station based at least in part on a multiplexing pattern.

40. An apparatus for wireless communications, comprising:

a processor,
memory coupled with the processor; and
instructions stored in the memory and executable by the processor to cause the apparatus to:

determine, based on synchronization signal/physical broadcast channel (SS/PBCH) blocks which are actually transmitted in a set of SS/PBCH blocks, corresponding physical downlink control channel (PDCCH) monitoring occasions within a system information window, wherein the PDCCH monitoring occasions within the system information window are determined based at least in part on actually transmitted SS/PBCH blocks in a set of SS/PBCH blocks and without regard to SS/PBCH blocks in the set of SS/PBCH blocks that are not transmitted;

transmit, to a user equipment (UE), an indication of which SS/PBCH blocks are actually transmitted; and transmit a physical downlink control channel within the system information window during the corresponding physical downlink control channel monitoring occasions.

41. The apparatus of claim 40, wherein the instructions are further executable by the processor to cause the apparatus to:

transmit retransmissions of the physical downlink control channel and system information messages based on a multiplexing of the physical downlink control channel monitoring occasions into a transmission, wherein the transmission is repeated within the SI window.

42. The apparatus of claim 40, wherein the instructions are further executable by the processor to cause the apparatus to:

transmit retransmissions of the physical downlink control channel and system information messages within the system information window.

43. The apparatus of claim 42, wherein the instructions to transmit retransmissions of the physical downlink control channel and system information messages are executable by the processor to cause the apparatus to:

transmit retransmissions of the physical downlink control channel that are non-continuous in time with an initial transmission of the physical downlink control channel.

44. The apparatus of claim 42, wherein the instructions to transmit retransmissions of the physical downlink control channel and system information messages are executable by the processor to cause the apparatus to:

transmit retransmissions of the physical downlink control channel that are continuous in time with an initial transmission of the physical downlink control channel.

45. The apparatus of claim 40, wherein the instructions to transmit the indication of which SS/PBCH blocks are actually transmitted are executable by the processor to cause the apparatus to:

transmit an index of each actually transmitted SS/PBCH block, a duration for the physical downlink control channel monitoring occasions, a duration of the system information window, a number of actually transmitted SS/PBCH blocks, or any combination thereof, via a system information block (SIB1).

46. The apparatus of claim 40, wherein the instructions are further executable by the processor to cause the apparatus to:

determine a starting time within the system information window for each of the corresponding physical downlink control channel monitoring occasions.

47. The apparatus of claim 46, wherein determining the starting time for each of the corresponding physical downlink control channel monitoring occasions is based on an index of each actually transmitted SS/PBCH block, a starting time of the system information window, a duration of the corresponding physical downlink control channel monitoring occasions, a number of corresponding physical downlink control channel monitoring occasions within a radio frame, or combinations thereof.

48. The apparatus of claim 46, wherein the starting time for each of the corresponding physical downlink control channel monitoring occasions is the same in different system information windows.

49. The apparatus of claim 46, wherein the starting time for each of the corresponding physical downlink control channel monitoring occasions is different in different system information windows.

50. The apparatus of claim 40, wherein the instructions are further executable by the processor to cause the apparatus to:
  indicate, via the monitored physical downlink control channel, one or more physical downlink shared channel resource allocations for receipt of other system information.

51. The apparatus of claim 50, wherein the one or more physical downlink shared channel resource allocations are the same as corresponding resource allocations for physical downlink shared channel messages carrying remaining minimum system information associated with the SS/PBCH blocks which are actually transmitted to the UE having a control resource set multiplexing pattern 1.

52. The apparatus of claim 50, wherein the one or more physical downlink shared channel resource allocations are the same as corresponding resource allocations for physical downlink shared channel messages carrying remaining minimum system information associated with the SS/PBCH blocks which are actually transmitted to the UE based at least in part on a multiplexing pattern.

53. An apparatus for wireless communication, comprising:
  means for receiving, from a base station that transmits synchronization signal/physical broadcast channel (SS/PBCH) blocks, an indication of which SS/PBCH blocks are actually transmitted by the base station in a set of SS/PBCH blocks;
  means for determining, based at least in part on the indication, corresponding physical downlink control channel (PDCCH) monitoring occasions within a system information window, wherein the PDCCH monitoring occasions within the system information window are determined based at least in part on actually transmitted SS/PBCH blocks in the set of SS/PBCH blocks and without regard to SS/PBCH blocks in the set of SS/PBCH blocks that are not transmitted by the base station; and
  means for monitoring for a physical downlink control channel within the system information window during the corresponding physical downlink control channel monitoring occasions.

54. An apparatus for wireless communications, comprising:
  means for determining, based on synchronization signal/physical broadcast channel (SS/PBCH) blocks which are actually transmitted in a set of SS/PBCH blocks, corresponding physical downlink control channel (PDCCH) monitoring occasions within a system information window, wherein the PDCCH monitoring occasions within the system information window are determined based at least in part on actually transmitted SS/PBCH blocks in the set of SS/PBCH blocks and without regard to SS/PBCH blocks in the set of SS/PBCH blocks that are not transmitted;
  means for transmitting, to a user equipment (UE), an indication of which SS/PBCH blocks are actually transmitted; and
  means for transmitting a physical downlink control channel within the system information window during the corresponding physical downlink control channel monitoring occasions.

55. A non-transitory computer-readable medium storing code for wireless communication, the code comprising instructions executable by a processor to:
  receive, from a base station that transmits synchronization signal/physical broadcast channel (SS/PBCH) blocks, an indication of which SS/PBCH blocks in a set of SS/PBCH blocks are actually transmitted by the base station;
  determine, based at least in part on the indication, corresponding physical downlink control channel (PDCCH) monitoring occasions within a system information window, wherein the PDCCH monitoring occasions within the system information window are determined based at least in part on actually transmitted SS/PBCH blocks in the set of SS/PBCH blocks and without regard to SS/PBCH blocks in the set of SS/PBCH blocks that are not transmitted by the base station; and
  monitor a physical downlink control channel within the system information window during the corresponding physical downlink control channel monitoring occasions.

56. A non-transitory computer-readable medium storing code for wireless communications, the code comprising instructions executable by a processor to:
  determine, based on synchronization signal/physical broadcast channel (SS/PBCH) blocks which are actually transmitted in a set of SS/PBCH block, corresponding physical downlink control channel (PDCCH) monitoring occasions within a system information window, wherein the PDCCH monitoring occasions within the system information window are determined based at least in part on actually transmitted SS/PBCH blocks in the set of SS/PBCH blocks and without regard to SS/PBCH blocks in the set of SS/PBCH blocks that are not transmitted;
  transmit, to a user equipment (UE), an indication of which SS/PBCH blocks are actually transmitted; and
  transmit a physical downlink control channel within the system information window during the corresponding physical downlink control channel monitoring occasions.

* * * * *